(12) United States Patent
Sekido et al.

(10) Patent No.: US 12,055,717 B2
(45) Date of Patent: Aug. 6, 2024

(54) INSPECTION SYSTEM AND INSPECTION METHOD

(71) Applicant: NEC Corporation, Tokyo (JP)

(72) Inventors: Masanori Sekido, Tokyo (JP); Naoya Nakayama, Tokyo (JP); Shinichi Morimoto, Tokyo (JP); Masayuki Ariyoshi, Tokyo (JP); Toshinori Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 17/739,414

(22) Filed: May 9, 2022

(65) Prior Publication Data

US 2022/0365346 A1    Nov. 17, 2022

(30) Foreign Application Priority Data

May 13, 2021    (JP) .................. 2021-081592

(51) Int. Cl.
*G06V 20/00*    (2022.01)
*G02B 27/01*    (2006.01)
*G06V 20/52*    (2022.01)

(52) U.S. Cl.
CPC ............ *G02B 27/017* (2013.01); *G06V 20/52* (2022.01); *G02B 2027/0138* (2013.01); *G02B 2027/014* (2013.01); *G02B 2027/0178* (2013.01)

(58) Field of Classification Search
CPC .......... G02B 27/017; G02B 2027/0138; G02B 2027/014; G02B 2027/0178; G02B 27/01; G06V 20/52

See application file for complete search history.

(56) References Cited

U.S. PATENT DOCUMENTS 10,891,753 B2 *   1/2021   Koskan ................. H04N 23/66
10,972,647 B2 *   4/2021   Setos ................... H04N 5/2228
(Continued)

FOREIGN PATENT DOCUMENTS

JP   2016-194759   11/2016

OTHER PUBLICATIONS

Kowalski "Hidden Object Detection and Recognition in Passive Terahertz and Mid-wavelength Infrared" Journal of Infrared, Millimeter, and Terahertz Waves, 2019.*

(Continued)

*Primary Examiner* — Frank F Huang
(74) *Attorney, Agent, or Firm* — Sughrue Mion, PLLC

(57) ABSTRACT

An inspection system acquires an inspection target person image including an inspection target person, irradiates an electromagnetic wave having a wavelength of equal to or more than 30 micrometers and equal to or less than one meter toward the inspection target person and receives a reflection wave, performs detection processing of detecting an anomalous state based on a signal of the reflection wave, causes a storage unit to store tracking target person information indicating an external appearance of a tracking target person being the inspection target person in which the anomalous state is detected, acquires a worker peripheral image including scenery in the periphery of a worker; detects the tracking target person from the worker peripheral image based on the tracking target person information, and notifies the worker of a position of the tracking target person detected from the worker peripheral image.

10 Claims, 20 Drawing Sheets

(56) References Cited

U.S. PATENT DOCUMENTS

| | | | | |
|---|---|---|---|---|
| 11,477,418 | B2* | 10/2022 | Fertitta | H04N 7/185 |
| 2015/0350902 | A1* | 12/2015 | Baxley | H04W 4/90 |
| | | | | 726/7 |
| 2017/0225336 | A1* | 8/2017 | Deyle | B25J 5/007 |
| 2019/0266414 | A1* | 8/2019 | Stawiszynski | G06Q 50/26 |
| 2021/0208949 | A1* | 7/2021 | Bijwe | G06F 9/5005 |
| 2021/0325561 | A1* | 10/2021 | Zhao | G01V 3/38 |

OTHER PUBLICATIONS

Kowalski et al. "Hidden Object Detection System Based on Fusion of THz and VIS Images," ACTA Physica Polonica A vol. 124, 2013.*

* cited by examiner

FIG. 5

TRACKING TARGET PERSON INFORMATION

| SERIAL NUMBER | IMAGE | EXTERNAL APPEARANCE INFORMATION | DETECTED OBJECT | CONFIRMATION FLAG | PERSON IN CHARGE | ... |
|---|---|---|---|---|---|---|
| D00001 | 00001.jpeg | *** | KNIFE | DONE | 0172 | ... |
| D00002 | 00002.jpeg | *** | PLASTIC BOTTLE | UNDONE | - | ... |
| ... | ... | ... | ... | ... | ... | ... |

FIG. 12

TRACKING TARGET PERSON INFORMATION

| SERIAL NUMBER | IMAGE | EXTERNAL APPEARANCE INFORMATION | DETECTED OBJECT | POSITION INFORMATION | CONFIR-MATION FLAG | PERSON IN CHARGE | |
|---|---|---|---|---|---|---|---|
| D00001 | 00001.jpeg | \* \* \* | KNIFE | 3F, IN FRONT OF ELEVATOR | DONE | 0172 | ... |
| D00002 | 00002.jpeg | \* \* \* | PLASTIC BOTTLE | 2F, WAITING LOBBY | UNDONE | – | ... |
| .... | .... | .... | .... | .... | .... | .... | .... |

FIG. 13

WORKER INFORMATION

| SERIAL NUMBER | POSITION INFORMATION | TERMINAL INFORMATION | . . . . |
|---|---|---|---|
| P0001 | $(X_1, Y_1)$ | * * * | . . . . |
| ⋮ | ⋮ | ⋮ | ⋮ |

INSPECTION SYSTEM AND INSPECTION METHOD

TECHNICAL FIELD

The present invention relates to an inspection system and an inspection method.

BACKGROUND ART

A technique associated with the present invention is disclosed in PTL 1 (Japanese Patent Application Publication No. 2016-194759).

PTL 1 discloses a technique in which a person within an image is analyzed by analyzing an image of a surveillance camera, and security information based on an analysis result is transmitted to a mobile terminal apparatus carried by a security guard.

SUMMARY

For ensuring safety and the like, an inspection such as a belongings inspection is performed in various places. Generally, when an anomalous state of an inspection target person is detected in an inspection by a system, a worker performs a further inspection on the spot with respect to the inspection target person. Then, only an inspection target person who is confirmed that there is no problem is allowed to pass through an inspection point. In a case of this method, a throughput of an inspection deteriorates. An object of the present invention is to improve a throughput of an inspection such as a belongings inspection.

The present invention provides an inspection system including:
- an inspection target person image acquisition means for acquiring an inspection target person image including an inspection target person;
- an electromagnetic wave transmission/reception means for irradiating an electromagnetic wave having a wavelength of equal to or more than 30 micrometers and equal to or less than one meter toward the inspection target person, and receiving a reflection wave;
- an anomalous state detection means for performing detection processing of detecting an anomalous state, based on a signal of the reflection wave, and causing a storage means to store tracking target person information indicating an external appearance of a tracking target person being the inspection target person in which the anomalous state is detected;
- a worker peripheral image acquisition means for acquiring a worker peripheral image including scenery in a periphery of a worker;
- a tracking target person detection means for detecting the tracking target person from the worker peripheral image, based on the tracking target person information; and
- a notification means for notifying the worker of a position of the tracking target person detected from the worker peripheral image.

Further, the present invention provides an inspection method including:
by a computer,
- acquiring an inspection target person image including an inspection target person;
- irradiating an electromagnetic wave having a wavelength of equal to or more than 30 micrometers and equal to or less than one meter toward the inspection target person, and receiving a reflection wave;
- performing detection processing of detecting an anomalous state, based on a signal of the reflection wave, and causing a storage means to store tracking target person information indicating an external appearance of a tracking target person being the inspection target person in which the anomalous state is detected;
- acquiring a worker peripheral image including scenery in a periphery of a worker;
- detecting the tracking target person from the worker peripheral image, based on the tracking target person information; and
- notifying the worker of a position of the tracking target person detected from the worker peripheral image.

According to the present invention, a throughput of an inspection such as a belongings inspection is improved.

BRIEF DESCRIPTION OF THE DRAWINGS

FIG. 5 is a diagram schematically illustrating one example of information to be processed by the inspection system according to the present example embodiment.

FIG. 12 is a diagram schematically illustrating one example of information to be processed by the inspection system according to the present example embodiment.

FIG. 13 is a diagram schematically illustrating one example of information to be processed by the inspection system according to the present example embodiment.

EXAMPLE EMBODIMENT

Hereinafter, example embodiments according to the present invention are described by using the drawings. Note that, in every drawing, a similar component is designated with a similar reference sign, and description thereof is omitted as necessary.

First Example Embodiment

"Overview"

In the present example embodiment, all inspection target persons can pass through an inspection point, regardless of a result of an inspection at the inspection point. For example, a walkthrough type belongings inspection and the like are performed at the inspection point. Further, an inspection system according to the present example embodiment provides a technique for supporting tracking of a tracking target person being an inspection target person in which an anomalous state is detected in an inspection. A worker finds a tracking target person from among persons passing through an inspection point by using the technique, and performs a further inspection and the like with respect to the tracking target person. Because of the presence of the technique, all inspection target persons are allowed to pass, regardless of a result of an inspection at an inspection point. Further, a throughput of an inspection to be performed at an inspection point improves by allowing all inspection target persons to pass through the inspection point.

Figure 1:
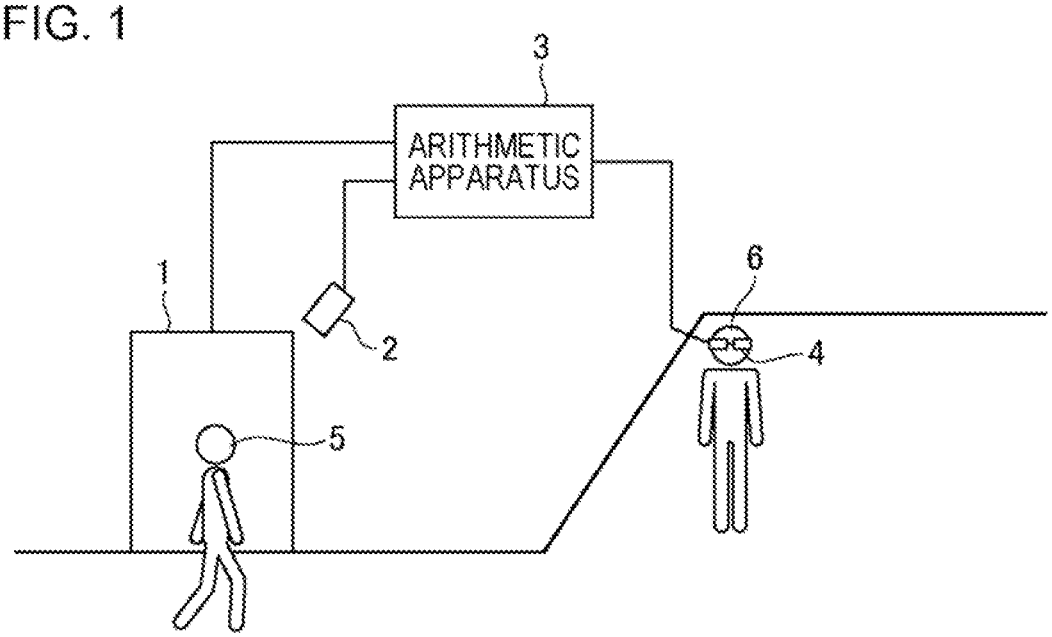
FIG. 1 is a diagram illustrating an overview of an inspection system according to the present example embodiment.

Herein, an overview of the inspection system according to the present example embodiment is described using FIG. 1. The inspection system is used in any facility where an inspection such as a belongings inspection is necessary. As the facility, a building, an office, an amusement facility, an airport, a station, and the like are exemplified, but the facility is not limited thereto.

The inspection system illustrated in FIG. 1 includes a sensor panel 1, a camera 2, an arithmetic apparatus 3, and smart glasses 4. Note that, a configuration of the inspection system illustrated in FIG. 1 is one example, and a modification example of the inspection system is described later as necessary.

The sensor panel 1 is installed at an inspection point provided at a predetermined position of a facility, for example, at an entrance and the like of a facility. The sensor panel 1 irradiates an electromagnetic wave toward an inspection target person 5 passing in front of the sensor panel 1, and receives a reflection wave. Further, the sensor panel 1 transmits a signal of the reflection wave to the arithmetic apparatus 3.

The camera 2 is installed at an inspection point. The camera 2 photographs the inspection target person 5 being present at the inspection point. Further, the camera 2 transmits an image of the inspection target person 5 to the arithmetic apparatus 3.

The arithmetic apparatus 3 may be a local apparatus installed at an inspection point, or may be a center apparatus installed at a position away from an inspection point. The arithmetic apparatus 3 performs detection processing of detecting an anomalous state, based on a signal of a reflection wave generated by the sensor panel 1. Further, the arithmetic apparatus 3 registers, in a database, information indicating an external appearance of the inspection target person 5 in which an anomalous state is detected. Information indicating an external appearance of the inspection target person 5 is generated based on an image of the inspection target person 5 received from the camera 2.

The smart glasses 4 are worn by a worker 6. The smart glasses 4 include at least a camera function of photographing a periphery of the worker 6 in such a way that a field of view of the worker 6 wearing the smart glasses 4 is included (in other words, "in such a way that scenery viewed by the worker 6 is included"), a display function of displaying information over the field of view of the worker 6 (in other words, "over scenery viewed by the worker 6"), and a communication function of communicating with the arithmetic apparatus 3.

At least either one of the arithmetic apparatus 3 and the smart glasses 4 analyzes an image including a field of view of the worker 6 generated by the smart glasses 4, and detects, from the image, the inspection target person 5 in which an anomalous state is detected. Further, in a case where the inspection target person 5 in which an anomalous state is detected is detected from the image, the smart glasses 4 display an image for identifying the detected inspection target person 5 over the field of view of the worker 6.

Figure 2:
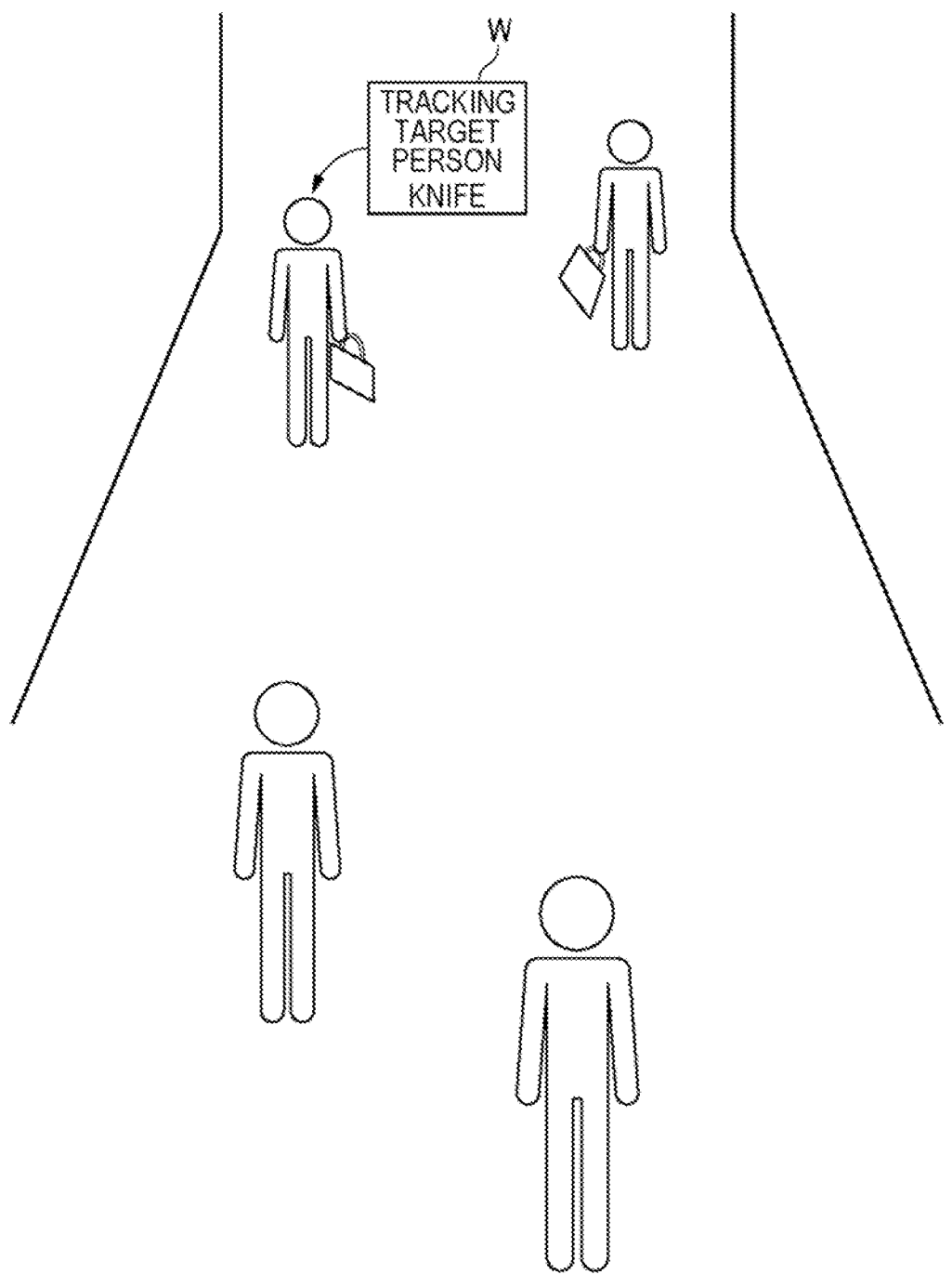
FIG. 2 is a diagram illustrating an advantageous effect of the inspection system according to the present example embodiment.

FIG. 2 illustrates one example of scenery viewed by the worker 6. Information attached with a symbol W is an image displayed over the field of view of the worker 6. The information attached with the symbol W is displayed on a lens of the smart glasses 4. Other persons, walls, and the like illustrated in FIG. 2 are scenery directly viewed by the worker 6 through the lens of the smart glasses 4.

In the inspection system according to the present example embodiment as described above, the worker 6 can easily find a tracking target person in which an anomalous state is detected in an inspection.

"Hardware Configuration"

Figure 3:
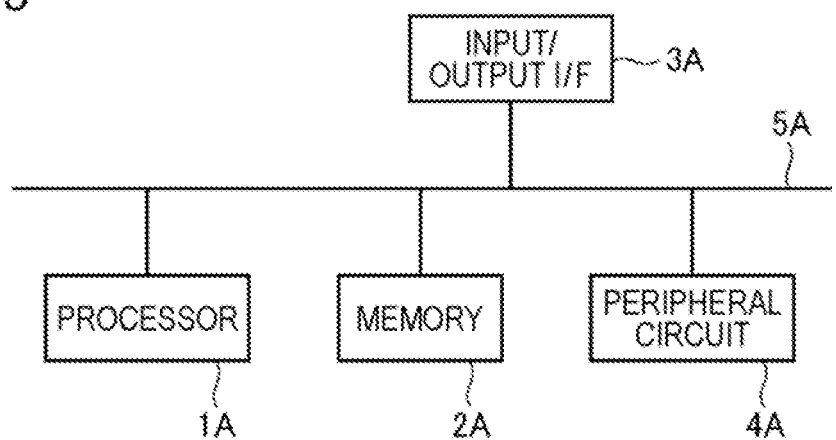
FIG. 3 is a diagram illustrating one example of a hardware configuration of the inspection system according to the present example embodiment.

Next, one example of a hardware configuration of the inspection system is described. FIG. 3 is a diagram illustrating a hardware configuration example of the inspection system. Each functional unit included in the inspection system is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus for achieving the configuration.

As illustrated in FIG. 3, the inspection system includes a processor 1A, a memory 2A, an input/output interface 3A, a peripheral circuit 4A, and a bus 5A. The peripheral circuit 4A includes various modules. The inspection system may not include the peripheral circuit 4A. Note that, the inspection system may be constituted of a plurality of apparatuses that are physically and/or logically separated, or may be constituted of one apparatus that is physically and logically integrated. In a case where the inspection system is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, an electromagnetic wave transmission/reception apparatus, and the like, an interface for outputting information to an output apparatus, an external apparatus, an external server, an electromagnetic wave transmission/reception apparatus, and the like, and the like. The input apparatus is, for example, a keyboard, a mouse, a microphone, and the like. The output apparatus is, for example, a display, a speaker, a printer, a mailer, and the like. The processor 1A can issue a command to each module, and perform an arithmetic operation, based on an arithmetic operation result of each module.

"Functional Configuration"

Figure 4:
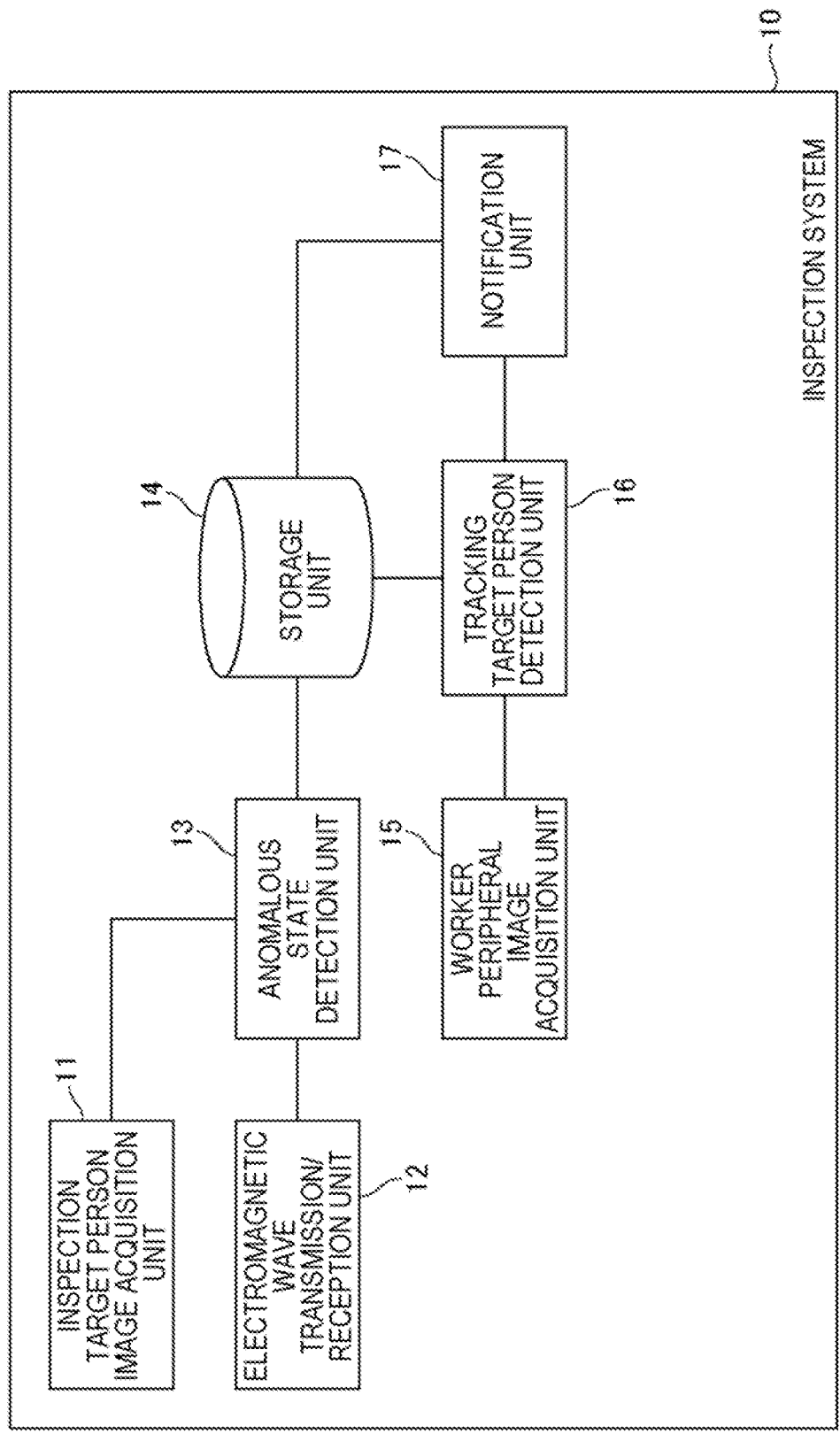
FIG. 4 is a diagram illustrating one example of a functional block diagram of the inspection system according to the present example embodiment.

Next, a functional configuration of the inspection system is described. FIG. 4 illustrates one example of a functional block diagram of an inspection system 10. As illustrated in FIG. 4, the inspection system 10 includes an inspection target person image acquisition unit 11, an electromagnetic wave transmission/reception unit 12, an anomalous state detection unit 13, a storage unit 14, a worker peripheral image acquisition unit 15, a tracking target person detection unit 16, and a notification unit 17. Note that, the inspection system 10 may not include the storage unit 14. In this case, an external apparatus configured to be communicable with the inspection system 10 includes the storage unit 14.

As described using FIG. 1, the inspection system 10 is constituted of a plurality of apparatuses that are physically and/or logically separated. Regarding which one of a plurality of apparatuses includes each of the above-described plurality of functional units, various configurations are conceived, and any configuration can be adopted.

For example, the inspection system 10 is constituted of an electromagnetic wave transmission/reception apparatus (the sensor panel 1 and the like in FIG. 1) installed at an inspection point, the camera 2 installed at the inspection point, the arithmetic apparatus 3, and a mobile terminal (such as the smart glasses 4 in FIG. 1) carried by a worker. The inspection system 10 may include a plurality of electromagnetic wave transmission/reception apparatuses that perform similar processing, and a plurality of cameras 2 that perform similar processing. In this case, an electromagnetic wave transmission/reception apparatus and the camera 2 are installed at each of a plurality of inspection points. Further, the inspection system 10 may include a plurality of mobile terminals. In this case, each of a plurality of workers carries a mobile terminal. Regarding which one of a plurality of apparatuses as described above includes each of the above-described plurality of functional units, various configurations are conceived, and any configuration can be adopted.

For example, the camera 2 may include the inspection target person image acquisition unit 11, and an electromagnetic wave transmission/reception apparatus may include the electromagnetic wave transmission/reception unit 12.

Further, the arithmetic apparatus 3 may include the anomalous state detection unit 13 and the storage unit 14, and a mobile terminal may include the worker peripheral image acquisition unit 15 and the notification unit 17. Further, at least either one of the arithmetic apparatus 3 and a mobile terminal may include the tracking target person detection unit 16.

Note that, the arithmetic apparatus 3 may be a physically and/or logically integrated one apparatus, or may be a plurality of apparatuses that are physically and/or logically separated. In the former case, the arithmetic apparatus 3 is a local apparatus installed at an inspection point, or a center apparatus installed at a place different from the inspection point. In the latter case, the arithmetic apparatus 3 includes both of a local apparatus installed at an inspection point, and a center apparatus installed at a place different from the inspection point. In a case where the arithmetic apparatus 3 is constituted of a local apparatus and a center apparatus, regarding which one of the above-described plurality of functional units is included in each of the local apparatus and the center apparatus, various configurations are conceived, and any configuration can be adopted.

Hereinafter, a configuration of a plurality of functional units illustrated in FIG. 4 is described in detail.

The inspection target person image acquisition unit 11 acquires an inspection target person image including an inspection target person. The inspection target person image acquisition unit 11 is configured to include the camera 2. The camera 2 may photograph a moving image or may photograph a still image. The camera 2 is installed at an inspection point, photographs an inspection target person before an inspection, during the inspection, or after the inspection, and generates an inspection target person image.

The electromagnetic wave transmission/reception unit 12 irradiates an electromagnetic wave (example: a microwave, a millimeter wave, a terahertz wave, and the like) having a wavelength of equal to or more than 30 micrometers and equal to or less than one meter toward a person being present in a predetermined area, and receives a reflection wave. The electromagnetic wave transmission/reception unit 12 is, for example, a radar. The electromagnetic wave transmission/reception unit 12 can be configured by adopting any technique. For example, as illustrated in an example in FIG. 1, the electromagnetic wave transmission/reception unit 12 may be the sensor panel 1 constituted of a radar in which a plurality of antenna elements are arranged. Note that, the sensor panel 1 is one example, and the electromagnetic wave transmission/reception unit 12 may be constituted of another means such as a gate through which a person passes, and a booth into which a person enters.

The anomalous state detection unit 13 performs detection processing of detecting an anomalous state, based on a signal of a reflection wave received by the electromagnetic wave transmission/reception unit 12. Further, the anomalous state detection unit 13 causes the storage unit 14 to store tracking target person information indicating an external appearance of a tracking target person being an inspection target person in which an anomalous state is detected.

An anomalous state in the present example embodiment is a state in which a person being present in a predetermined area carries a detection target object being set in advance. The detection target object is, for example, an object being prohibited to be carried in, and a gun, a knife, a camera, a plastic bottle, and the like are exemplified, but the detection target object is not limited thereto.

Tracking target person information is generated based on an inspection target person image acquired by the inspection target person image acquisition unit 11. For example, tracking target person information may be a feature value (such as a feature value of a face, a feature value of a physical constitution, a feature value of a gait, a feature value of clothes, and a feature value of a belongings) of an external appearance of an inspection target person extracted from an inspection target person image. Further, tracking target person information may be an inspection target person image itself.

FIG. 5 schematically illustrates one example of tracking target person information. In the illustrated example, tracking target person information includes columns of a serial number, an image, external appearance information, a detected object, a confirmation flag, and a person in charge. An image to be registered in association with a tracking target person may be a still image, or may be a moving image.

Information for identifying a plurality of tracking target persons one from another is registered in the column of a serial number. The anomalous state detection unit 13 issues a new serial number in accordance with a predetermined rule, when a new tracking target person is registered in tracking target person information.

A file name of an inspection target person image including a tracking target person is registered in the column of an image. A thumbnail image may be registered, in place of or in addition to a file name.

A feature value of an external appearance of an inspection target person detected from an inspection target person image is registered in the column of external appearance information.

Information indicating a detection target object detected by the anomalous state detection unit 13 is registered in the column of a detected object.

Information indicating whether a worker has contacted a tracking target person, and safety confirmation has been performed is registered in the column of a confirmation flag.

Information indicating a person in charge who has contacted a tracking target person is registered in the column of a person in charge.

Processing of registering information in the columns of a confirmation flag and a person in charge is described in the following.

Herein, one example of processing is described in which the anomalous state detection unit 13 determines whether an inspection target person being present in a predetermined area carries a detection target object being set in advance, based on a signal of a reflection wave.

First Processing Example

In the example, the anomalous state detection unit 13 generates a transmission image, based on a signal of a reflection wave received by the electromagnetic wave transmission/reception unit 12. Further, the anomalous state detection unit 13 detects a detection target object from the transmission image, based on a shape of an object appearing in the transmission image. In a case where a detection target object is detected from a transmission image, it is determined that an inspection target person being present in a predetermined area carries the detected detection target object.

By preparation in advance, a feature value of a shape of each of a plurality of detection target objects is generated, and stored in the storage unit 14. The anomalous state detection unit 13 detects a detection target object from a transmission image, based on a collation result between a feature value of a shape of a detection target object stored in the storage unit 14, and a feature value of a shape appearing in the transmission image. These processing by the anomalous state detection unit 13 may be achieved by using an estimation model generated by machine learning based on training data configured of transmission images and labels of a plurality of objects, or may be achieved by template matching.

Second Processing Example

In the example, the anomalous state detection unit 13 determines whether an inspection target person being present in a predetermined area carries a detection target object being set in advance, based on a feature value (reflection wave feature value) appearing in a signal of a reflection wave received by the electromagnetic wave transmission/reception unit 12. In a case where a reflection wave feature value unique to a detection target object is detected from a signal of a reflection wave, it is determined that an inspection target person being present in a predetermined area carries the detected detection target object.

By preparation in advance, a reflection wave feature value of each of a plurality of detection target objects is generated, and stored in the storage unit 14. The anomalous state detection unit 13 detects a reflection wave feature value unique to a detection target object from a signal of a reflection wave, based on a collation result between a reflection wave feature value of a detection target object stored in the storage unit 14, and a feature value appearing in the signal of the reflection wave. These processing by the anomalous state detection unit 13 may be achieved by using an estimation model generated by machine learning based on training data configured of signals of reflection waves and labels of a plurality of objects, or may be achieved by template matching.

Referring back to FIG. 4, the worker peripheral image acquisition unit 15 acquires a worker peripheral image including scenery in a periphery of a worker. A mobile terminal carried by a worker includes the worker peripheral image acquisition unit 15. In the present example embodiment, a mobile terminal of a worker is the smart glasses 4.

As illustrated in FIG. 1, the worker 6 wears the smart glasses 4. The smart glasses 4 have at least a camera function of photographing the periphery of the worker 6 in such a way that a field of view of the worker 6 wearing the smart glasses 4 is included, a display function of displaying information over a field of view of the worker 6, and a communication function of communicating with an external apparatus. By photographing using the camera function of the smart glasses 4, a worker peripheral image including a field of view of a worker, specifically, a worker peripheral image including scenery viewed by a worker is generated. A moving image may be photographed, or a still image may be photographed by using the camera function of the smart glasses 4. A configuration of the smart glasses 4 is achievable by adopting any conventional art.

Referring back to FIG. 4, the tracking target person detection unit 16 detects a tracking target person from a worker peripheral image acquired by the worker peripheral image acquisition unit 15, based on tracking target person information (see FIG. 5) stored in the storage unit 14. Further, the tracking target person detection unit 16 outputs information (coordinate) indicating a position of the detected tracking target person within the worker peripheral image.

Note that, detection processing of a tracking target person using tracking target person information (see FIG. 5) by the tracking target person detection unit 16 may be performed by setting tracking target person information in which a confirmation flag is "undone", specifically, only tracking target person information of a tracking target person for whom contact by a worker has not been performed, as a processing target (reference target). Tracking target person information in which a confirmation flag is "done", specifically, tracking target person information of a tracking target person for whom contact by a worker is completed may be eliminated from a processing target (reference target).

The notification unit 17 notifies a worker of a position of a tracking target person detected from a worker peripheral image. The notification unit 17 achieves the above-described notification by displaying an image for identifying a detected tracking target person over a field of view of a worker.

FIG. 2 illustrates one example of scenery viewed by a worker. The notification unit 17 displays, on a lens of smart glasses 4 worn by a worker, information attached with the symbol W. The lens of the smart glasses 4 constitutes a transmissive type display. For this reason, as illustrated in FIG. 2, scenery viewed by the worker includes not only information attached with the symbol W being displayed on a transmissive type display but also scenery such as a person and a wall that can be viewed through the transmissive type display. A tracking target person viewed through a transmissive type display can be identified by information attached with the symbol W being displayed at an appropriate position.

As illustrated in FIG. 2, the notification unit 17 may further notify a worker of a content of an anomalous state detected by the anomalous state detection unit 13. In the example illustrated in FIG. 2, a detected detection target object (illustrated "knife") is notified. In addition to the above, although illustration is omitted, the inspection system 10 may register, in the storage unit 14, a date and time when a detection target object is detected, and an inspection point. Further, the inspection system 10 may determine a position (e.g., inside a bag, inside a pocket of an outerwear, and the like) where a detection target object is detected, and register the determined position in the storage unit 14. Further, the notification unit 17 may further notify the worker of these pieces of information. Note that, in FIG. 2, a tracking target person and a detected detection target object are indicated by character information and a speech balloon, these detection contents may be indicated by another method. For example, a tracking target person may be highlighted by a figure, animation, or the like, and an image of a detection target object may be displayed over the position of the detected detection target object.

Further, although not illustrated in FIG. 2, the notification unit 17 may further display an image of a tracking target person indicated by an inspection target person image.

Display by the notification unit 17 as illustrated in FIG. 2 is achievable by using an augmented reality (AR) technique. For example, the notification unit 17 holds in advance a conversion rule (example: a conversion formula and the like configured of a matrix and the like) for converting a coordinate within a worker peripheral image into a coordinate within a display image to be displayed on a transmissive type display. Further, the notification unit 17 converts a coordinate indicating a position of a tracking target person within a worker peripheral image into a coordinate within the display image, based on the conversion rule. Further, the notification unit 17 causes to display information attached with the symbol W at a position associated with the coordinate within the display image acquired by the conversion.

A conversion rule can be generated, based on a parameter such as an orientation of a lens or a distortion of a lens of a camera included in smart glasses, an orientation of a transmissive type display, a relative positional relation between the camera and the transmissive type display, and a relative positional relation between an eye of a worker wearing smart glasses, and a transmissive type display.

Figure 6:
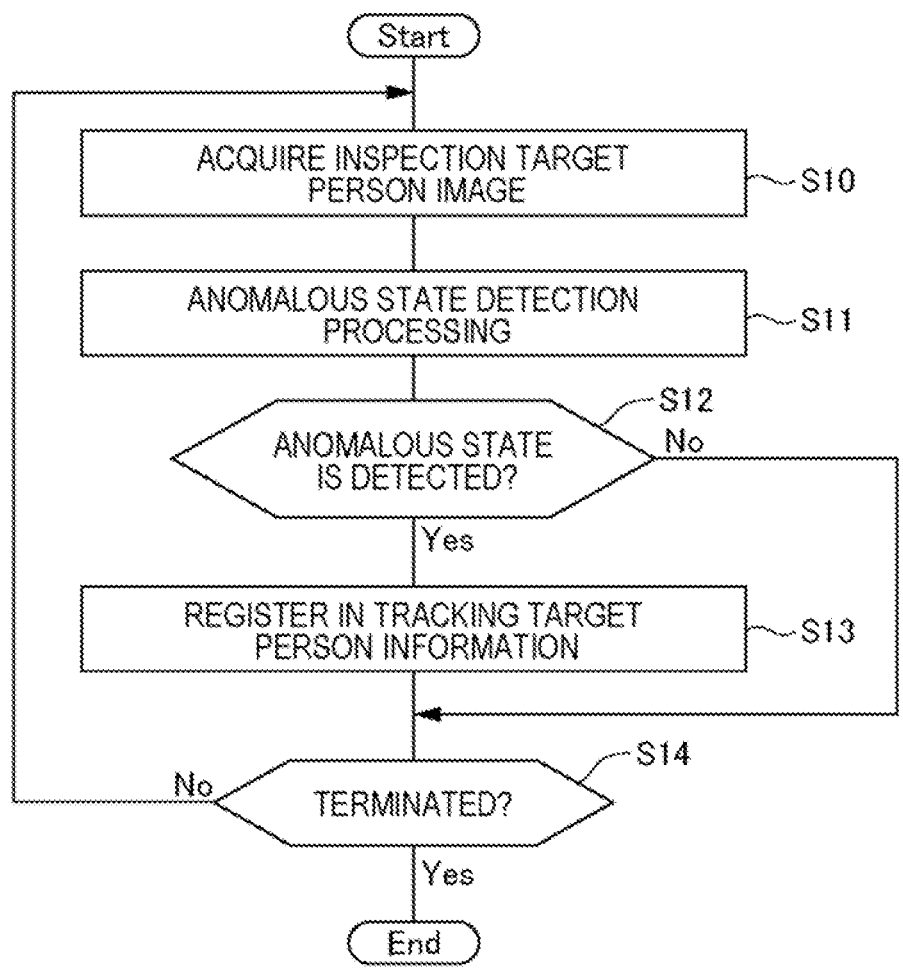
FIG. 6 is a flowchart illustrating one example of a flow of processing of the inspection system according to the present example embodiment.

Next, one example of a flow of processing of the inspection system 10 is described using FIGS. 1, 5, and 6. FIG. 6 illustrates one example of a flow of processing of inspecting an inspection target person, and registering, as a tracking target person, an inspection target person in which an anomalous state is detected. Processing illustrated in FIG. 6 is achieved by the inspection target person image acquisition unit 11, the electromagnetic wave transmission/reception unit 12, the anomalous state detection unit 13, and the storage unit 14.

First, the inspection system 10 acquires an inspection target person image including an inspection target person who has reached an inspection point (S10). For example, the camera 2 illustrated in FIG. 1 photographs the inspection target person 5 who has reached the inspection point, and generates an inspection target person image.

Next, the inspection system 10 performs processing of detecting an anomalous state with respect to the inspection target person who has reached the inspection point (S11). An anomalous state in the present example embodiment is a state in which an inspection target person carries a detection target object being set in advance. The detection target object is, for example, an object being prohibited to be carried in, and a gun, a knife, a camera, a plastic bottle, and the like are exemplified, but the detection target object is not limited thereto. For example, the sensor panel 1 illustrated in FIG. 1 irradiates an electromagnetic wave toward the inspection target person 5, and receives a reflection wave. Further, the inspection system 10 performs processing of detecting a detection target object, based on a signal of the reflection wave.

Note that, a processing order of S10 and S11 is not limited to the illustrated example. S10 may be performed after S11, or S10 and S11 may be performed in parallel.

In a case where an anomalous state is detected (Yes in S12), as illustrated in FIG. 5, the inspection system 10 causes the storage unit 14 to store tracking target person information indicating an external appearance of the inspection target person (tracking target person) (S13). Tracking target person information indicating an external appearance of an inspection target person is generated based on an inspection target person image including the inspection target person acquired in S10. Tracking target person information includes at least either one of a feature value (external appearance information) of an external appearance of the inspection target person, and an inspection target person image itself. Further, in processing of S13, the inspection system 10 may cause the storage unit 14 to further store a content of a detected anomalous state, for example, information indicating a detected detection target object.

On the other hand, in a case where an anomalous state is not detected (No in S12), the inspection system 10 does not cause the storage unit 14 to store tracking target person information indicating an external appearance of the inspection target person.

Note that, an inspection target person is allowed to pass through the inspection point, regardless of whether an anomalous state is detected. As a modification example of the processing, handling of an inspection target person may be changed according to a type of a detected detection target object. For example, an inspection target person in which a detection target object of a relatively low risk (e.g., a plastic bottle and the like) is detected may be allowed to pass through the inspection point, and an inspection target person in which a detection target object of a relatively high risk (e.g., a knife, a gun, and the like) is detected may be subjected to a secondary inspection on the spot, and allowed to pass through the inspection point after safety is confirmed.

Figure 7:
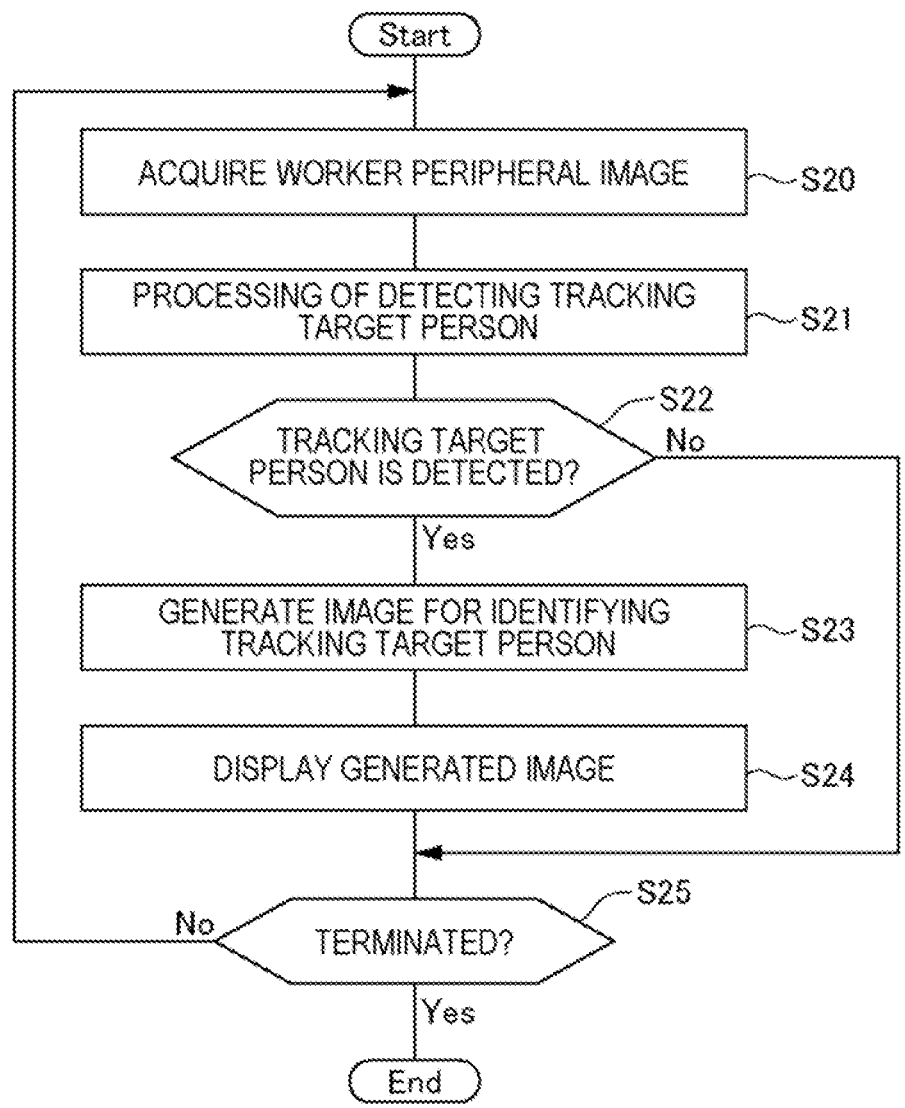
FIG. 7 is a flowchart illustrating one example of a flow of processing of the inspection system according to the present example embodiment.

Next, one example of a flow of another processing of the inspection system 10 is described using FIGS. 1, 2, 5, and 7. FIG. 7 illustrates one example of a flow of processing for tracking a tracking target person. Processing illustrated in FIG. 7 is achieved by the storage unit 14, the worker peripheral image acquisition unit 15, the tracking target person detection unit 16, and the notification unit 17.

First, the inspection system 10 acquires a worker peripheral image generated by a camera function of smart glasses worn by a worker (S20). For example, a worker peripheral image is generated by a camera function of the smart glasses 4 worn by the worker 6 illustrated in FIG. 1. A worker peripheral image generated as described above is scenery in a periphery of the worker 6, and includes scenery viewed by the worker 6.

Next, the inspection system 10 performs processing of detecting a tracking target person from a worker peripheral image, based on tracking target person information (see FIG. 5) stored in the storage unit 14 (S21).

In a case where a tracking target person is detected from a worker peripheral image (Yes in S22), the inspection system 10 generates an image to be displayed on the smart glasses 4 in FIG. 1, which is an image for identifying a tracking target person (S23). Then, the inspection system 10 causes the smart glasses 4 to display the image generated in S23 (S24). Consequently, as illustrated in FIG. 2, information (information attached with the symbol W) for identifying a detected tracking target person is displayed over the field of view of the worker. When determining a tracking target person, based on the information, the worker contacts the tracking target person, and performs an appropriate work such as a secondary inspection. After the work is completed, the worker operates the smart glasses 4, and inputs a work result. The inspection system 10 registers information in the columns of a confirmation flag and a person in charge of tracking target person information illustrated in FIG. 5, based on a work result input as described above.

In a case where a tracking target person is not detected from a worker peripheral image (No in S22), processing of S23 and S24 is not performed.

The above-described processing from S21 to S24 is performed speedily by real-time processing in response to acquisition of a worker peripheral image in S20.

Note that, processing of S21 may be performed by setting tracking target person information in which a confirmation flag is "undone", specifically, only tracking target person information of a tracking target person for whom contact by a worker has not been performed, as a processing target (reference target). Tracking target person information in which a confirmation flag is "done", specifically, tracking target person information of a tracking target person for whom contact by a worker is completed may be eliminated from a processing target (reference target).

"Advantageous Effect"

In the inspection system 10 according to the present example embodiment, a worker can easily find a tracking target person from among persons passing through an inspection point. Further, a worker can perform a further inspection and the like with respect to the found tracking target person. Therefore, a significantly serious problem does not occur, even when all inspection target persons are allowed to pass through an inspection point, regardless of a result of an inspection at the inspection point. A throughput of an inspection to be performed at an inspection point improves by allowing all inspection target persons to pass through the inspection point, regardless of a result of an inspection at the inspection point.

Second Example Embodiment

An inspection system 10 according to the present example embodiment is different from that of the first example embodiment in a point that a mobile terminal carried by a worker is not smart glasses. A mobile terminal according to the present example embodiment may be any apparatus, as far as the apparatus has at least a camera function, a display function, and a communication function, and for example, a smartphone, a tablet terminal, a smartwatch, a mobile phone, and the like are exemplified.

Figure 8:
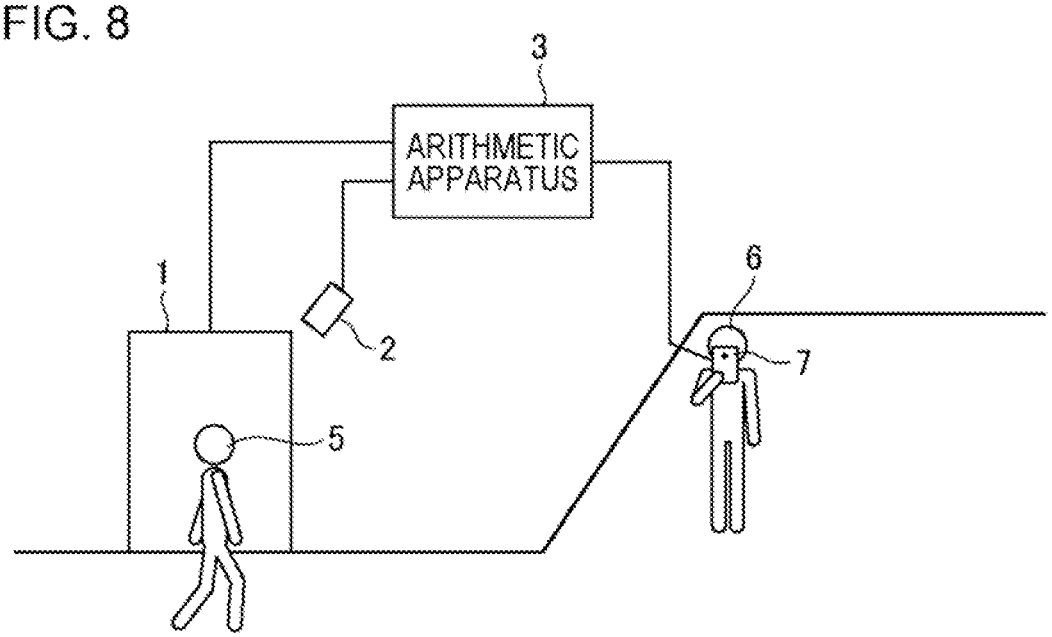
FIG. 8 is a diagram illustrating an overview of the inspection system according to the present example embodiment.

As illustrated in FIG. 8, a worker 6 activates a camera function of a mobile terminal 7, and directs a camera toward a periphery. Consequently, an image generated by the camera is displayed on a display of the mobile terminal 7. The image indicates scenery in the periphery of the worker 6, more specifically, scenery in a direction in which the camera is directed.

A worker peripheral image acquisition unit 15 acquires, as a worker peripheral image, an image indicating scenery in the periphery of the worker 6 being generated by the mobile terminal 7 as described above. The mobile terminal 7 carried by the worker 6 includes the worker peripheral image acquisition unit 15.

Figure 9:
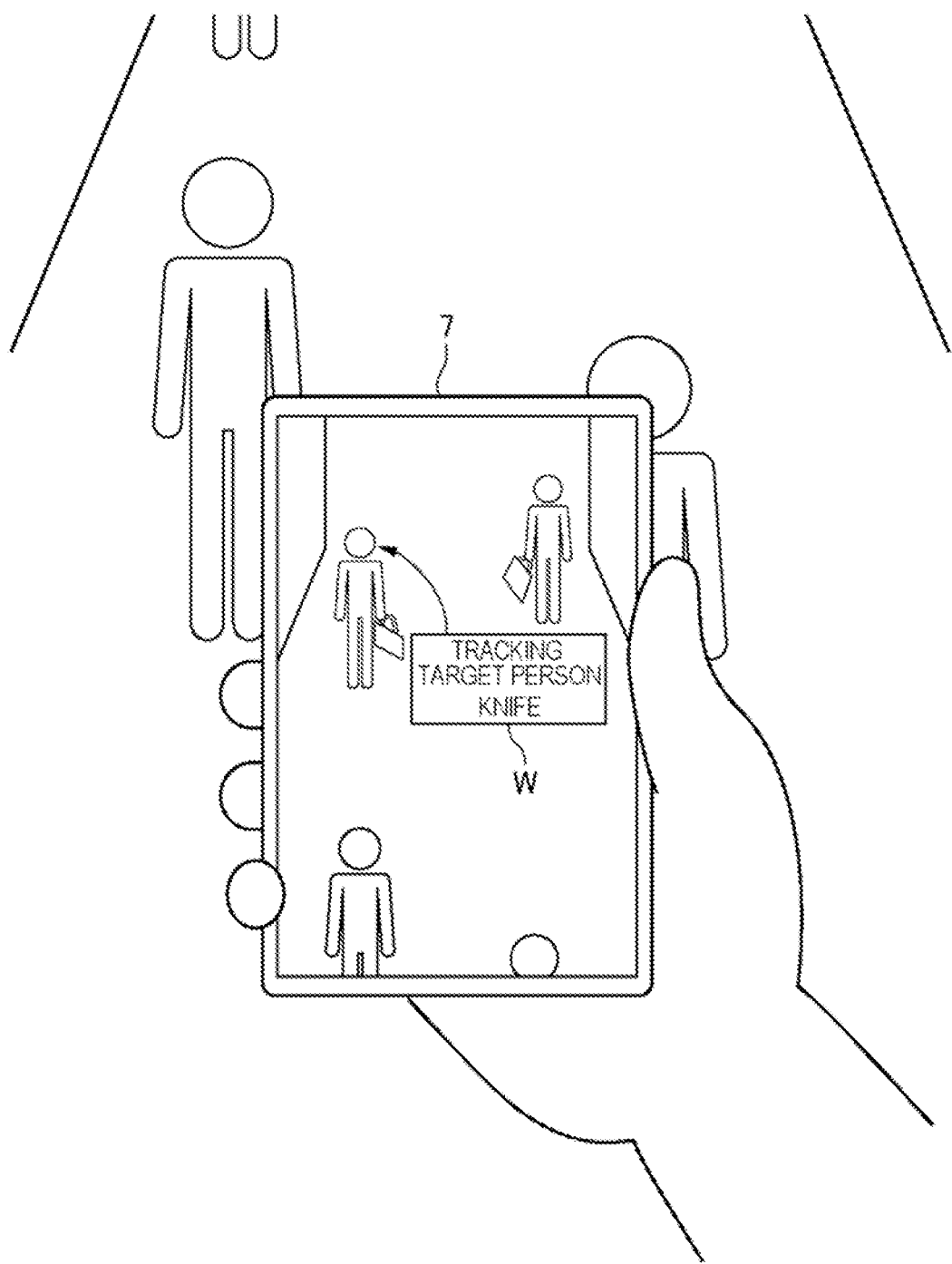
FIG. 9 is a diagram illustrating an advantageous effect of the inspection system according to the present example embodiment.

Further, a notification unit 17 causes the mobile terminal 7 to display an image in which information for identifying a detected tracking target person is displayed over a worker peripheral image. FIG. 9 illustrates one example of an image to be displayed on the mobile terminal 7. Information attached with a symbol W is information displayed over a worker peripheral image. The information enables to identify a tracking target person. Information attached with the symbol W is displayed at a predetermined position associated with a position of a detected tracking target person within a worker peripheral image. Notification by the notification unit 17 as illustrated in FIG. 9 is achievable by using an AR technique.

Figure 10:
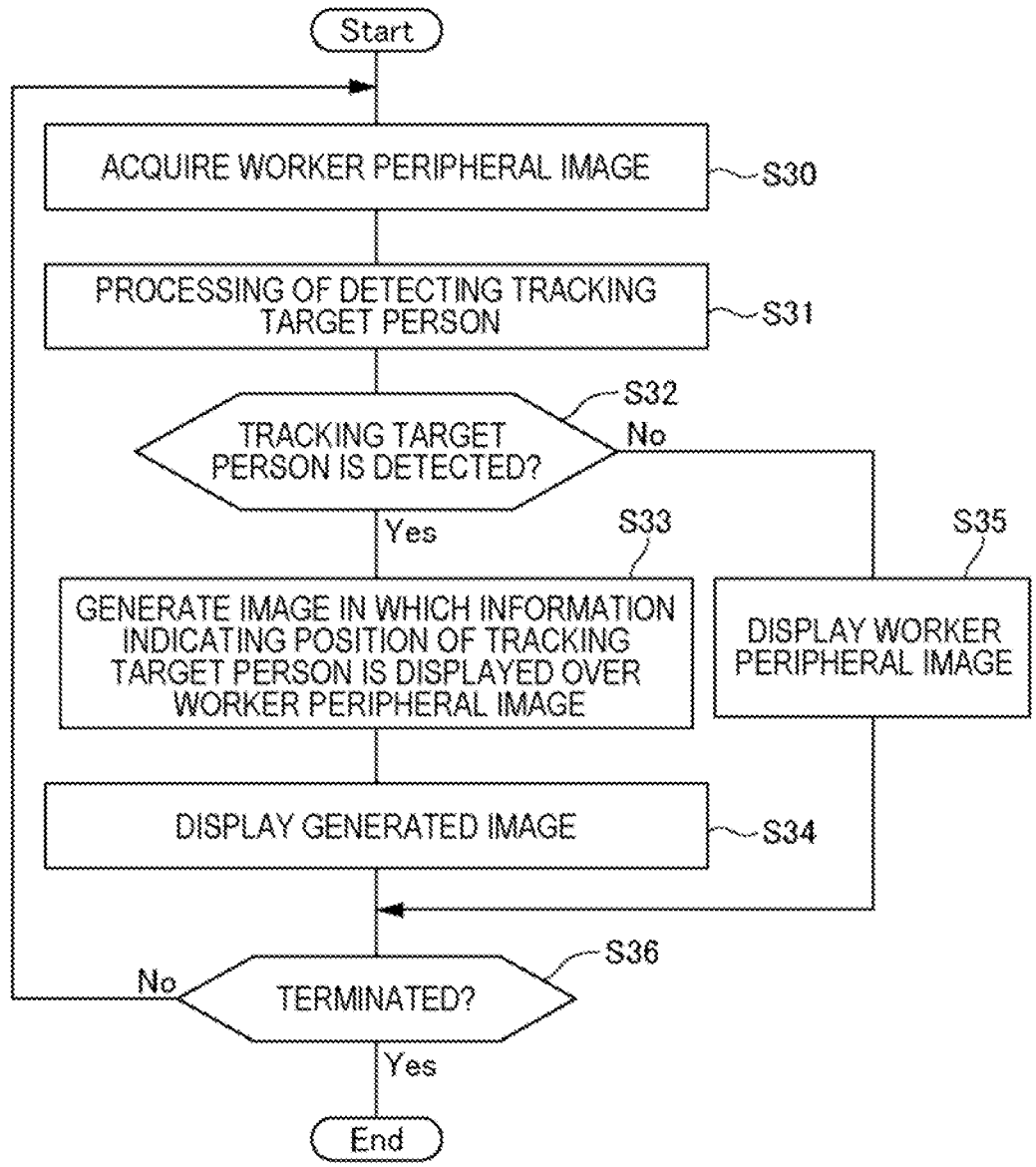
FIG. 10 is a flowchart illustrating one example of a flow of processing of the inspection system according to the present example embodiment.

Next, one example of a flow of processing of the inspection system 10 is described using FIGS. 5, 8, 9, and 10. FIG. 10 illustrates one example of a flow of processing for tracking a tracking target person. Processing illustrated in FIG. 10 is achieved by a storage unit 14, the worker peripheral image acquisition unit 15, a tracking target person detection unit 16, and the notification unit 17.

First, the inspection system 10 acquires a worker peripheral image generated by a camera function of a mobile terminal carried by a worker (S30). For example, a worker peripheral image is generated by a camera function of the mobile terminal 7 carried by the worker 6 illustrated in FIG. 8. A worker peripheral image generated as described above includes scenery in the periphery of the worker 6.

Next, the inspection system 10 performs processing of detecting a tracking target person from a worker peripheral image, based on tracking target person information (see FIG. 5) stored in the storage unit 14 (S31).

In a case where a tracking target person is detected from a worker peripheral image (Yes in S32), the inspection system 10 generates an image in which information for identifying a detected tracking target person is displayed over the worker peripheral image (S33). Then, the inspection system 10 causes a display of the mobile terminal to display the image generated in S33 (S34). Consequently, as illustrated in FIG. 9, an image in which information (information attached with the symbol W) for identifying a detected tracking target person is displayed over the worker peripheral image is displayed on the mobile terminal 7. When determining a tracking target person, based on the information, a worker contacts the tracking target person, and performs an appropriate work such as a secondary inspection. After the work is completed, a worker operates the mobile terminal 7, and inputs a work result. The inspection system 10 registers information in columns of a confirmation flag and a person in charge of tracking target person information illustrated in FIG. 5, based on a work result input as described above.

Figure 11:
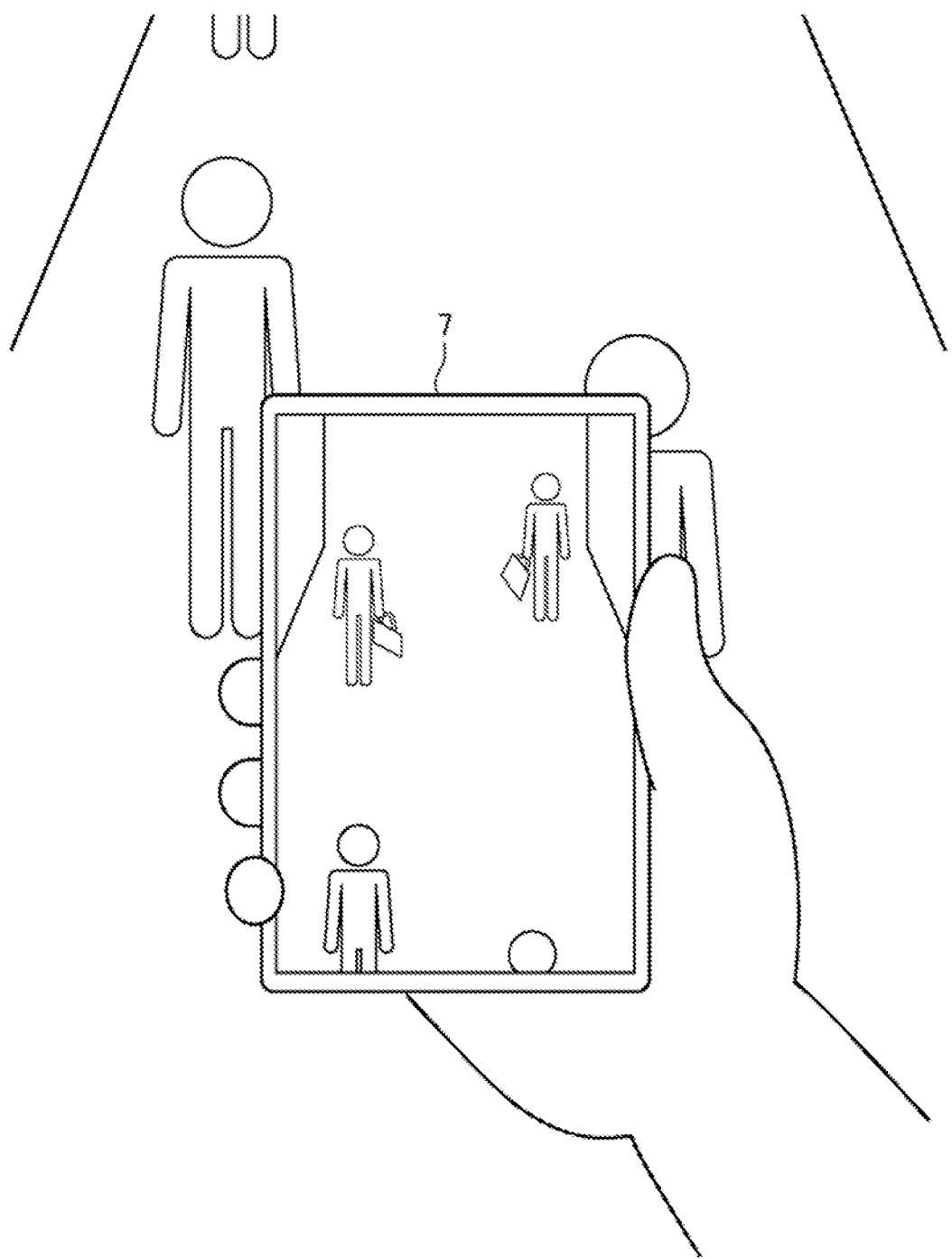
FIG. 11 is a diagram illustrating an advantageous effect of the inspection system according to the present example embodiment.

In a case where a tracking target person is not detected from a worker peripheral image (No in S32), the inspection system 10 causes a display of the mobile terminal to display a worker peripheral image (S35). In this case, as illustrated in FIG. 11, only a worker peripheral image is displayed on the mobile terminal 7, and information (information attached with the symbol W) for identifying a detected tracking target person is not displayed.

The above-described processing from S31 to S35 is performed speedily by real-time processing in response to acquisition of a worker peripheral image in S30.

Note that, processing of S31 may be performed by setting tracking target person information in which a confirmation flag is "undone", specifically, only tracking target person information of a tracking target person for whom contact by a worker has not been performed, as a processing target (reference target). Tracking target person information in which a confirmation flag is "done", specifically, tracking target person information of a tracking target person for whom contact by a worker is completed may be eliminated from a processing target (reference target).

Other configuration of the inspection system 10 according to the present example embodiment is similar to that of the first example embodiment. In the inspection system 10 according to the present example embodiment, an advantageous effect similar to that of the first example embodiment is achieved.

Third Example Embodiment

An inspection system according to the present example embodiment includes a plurality of mobile terminals. Further, each of a plurality of workers carries a mobile terminal. The mobile terminal may be smart glasses described in the first example embodiment, or may be another apparatus described in the second example embodiment, for example, a smartphone, a tablet terminal, a smartwatch, a mobile phone, and the like.

A worker peripheral image acquisition unit 15 acquires, in addition to a worker peripheral image, position information indicating a position of a worker at a time when the worker peripheral image is generated.

Various means for acquiring the position information are conceived. For example, a mobile terminal carried by a worker may include a position information acquisition function (e.g., a global positioning system (GPS) function, and the like) of indicating a position of the own terminal.

Further, acquisition of the above-described position information may be achieved by using the position information acquisition function of a mobile terminal.

In addition to the above, the worker peripheral image acquisition unit 15 may determine a position of a worker by detecting, from a worker peripheral image, a predetermined landmark registered in advance. In addition to the above, a position of each of a plurality of workers may be managed on a real-time basis by using any well-known technique such as a beacon and a radio frequency (RF) tag. Further, a position of a worker associated with a date and time when a worker peripheral image is generated may be determined based on the managed information.

When detecting a tracking target person from a worker peripheral image, a tracking target person detection unit 16 registers, in tracking target person information, position information indicating a position of a worker at a time when the worker peripheral image is generated, as position information indicating a position of a tracking target person. FIG. 12 schematically illustrates one example of tracking target person information. In the illustrated example, position information is registered in association with each tracking target person. The position information is updated each time each tracking target person is detected from a worker peripheral image.

A notification unit 17 notifies another worker of position information of each tracking target person registered in tracking target person information, specifically, position information of a worker at a time when a latest worker peripheral image in which each tracking target person is detected is generated. The notification is achieved via a mobile terminal carried by each worker.

By the notification, not only a worker who photographs a tracking target person but also another worker can recognize a position of the tracking target person. Further, the another worker can rush to the spot as necessary, and support work such as a secondary inspection.

Note that, as illustrated in FIG. 13, the inspection system 10 may manage a position of each of a plurality of workers on a real-time basis. Management of a position of a worker may be achieved by using a position information acquisition function included in a mobile terminal carried by the worker, or may be achieved by using another well-known technique such as a beacon and an RF tag.

Further, the notification unit 17 may notify only a worker who satisfies a predetermined condition regarding a positional relation with respect to a tracking target person, of information indicating a position of the tracking target person. Examples of the predetermined condition are "being present on a same floor", "a distance to a tracking target person is equal to or less than a threshold value", "in a case where a plurality of workers are ranked in an order of increasing a distance to a tracking target person, being present in a predetermined ranking from a highest rank", and the like, but the predetermined condition is not limited thereto. This enables to notify only an appropriate worker.

Figure 14:
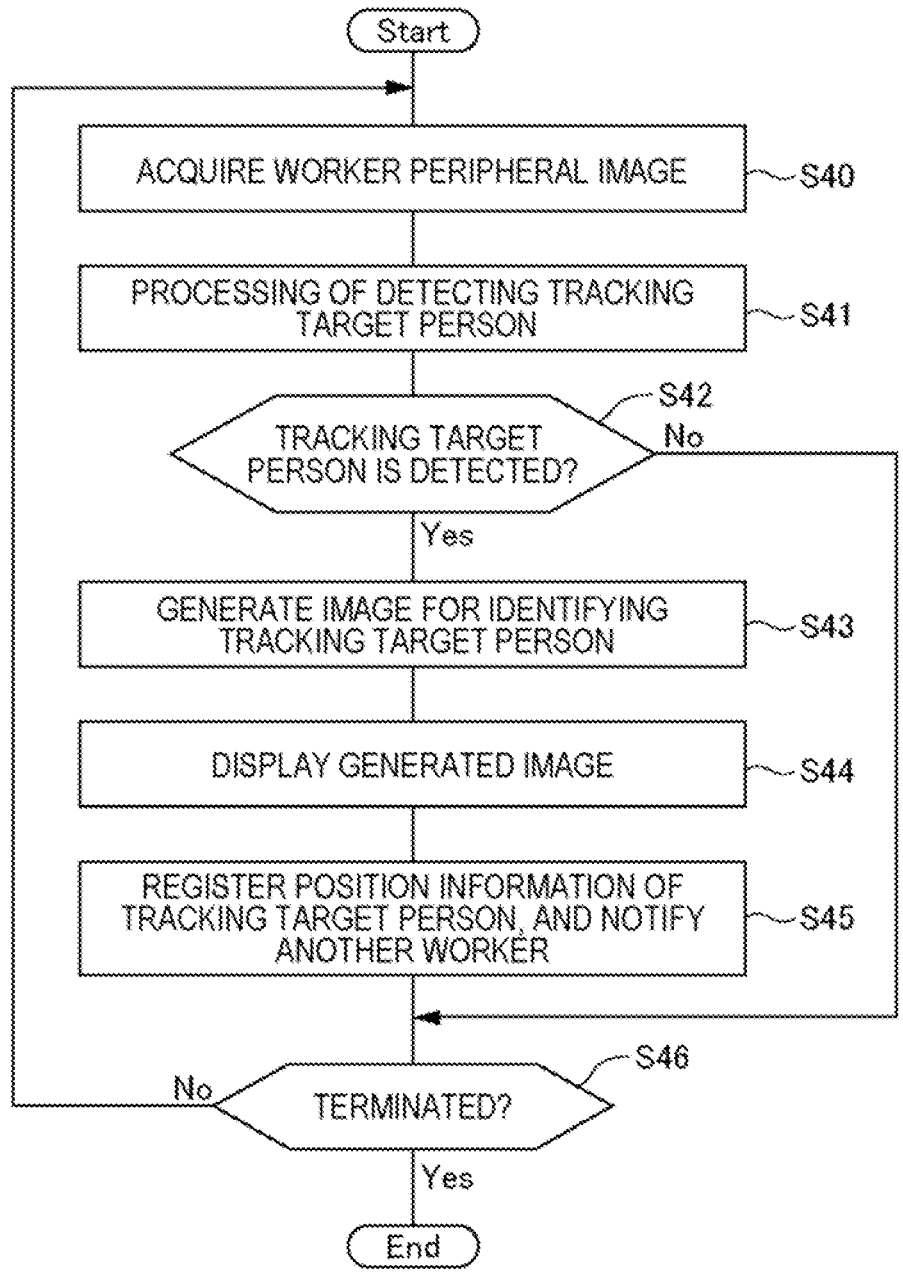
FIG. 14 is a flowchart illustrating one example of a flow of processing of the inspection system according to the present example embodiment.

One example of a flow of processing of the inspection system 10 is described using FIG. 14. FIG. 14 illustrates one example of a flow of processing for tracking a tracking target person. The processing is processing in a case where a mobile terminal carried by a worker is smart glasses. Processing illustrated in FIG. 14 is achieved by a storage unit 14, the worker peripheral image acquisition unit 15, the tracking target person detection unit 16, and the notification unit 17.

Processing illustrated in FIG. 14 is different from processing illustrated in FIG. 7 in a point that processing of S45 is included. In S45, the inspection system 10 registers, in tracking target person information (see FIG. 12), position information indicating a position of a worker at a time when a worker peripheral image in which a tracking target person is detected is generated, as position information indicating a position of a tracking target person. Further, the inspection system 10 notifies another worker of the position information indicating the position of the tracking target person.

Note that, processing of S45 may be performed before processing of S43 and S44, or may be performed with processing of S43 and S44 in parallel.

Figure 15:
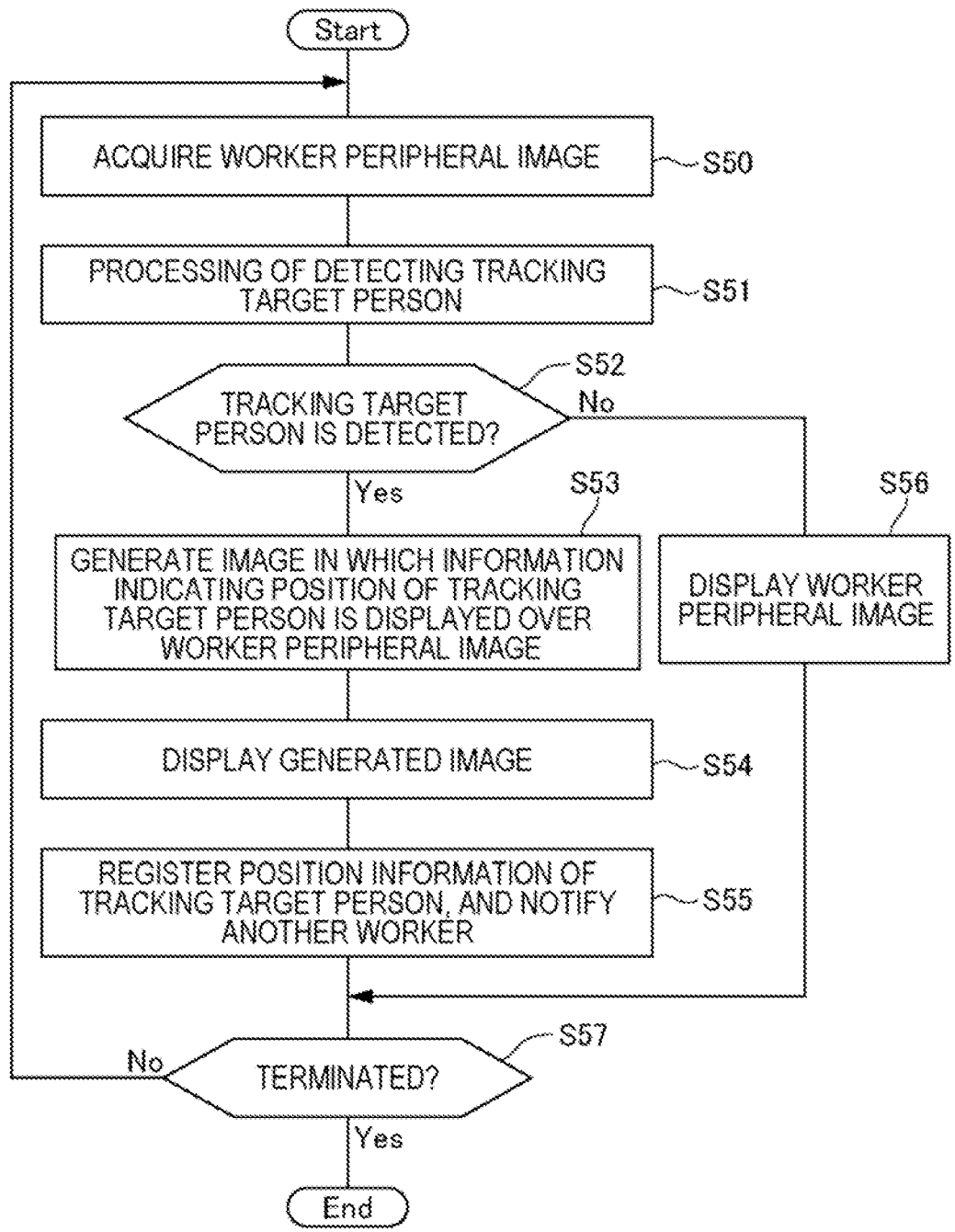
FIG. 15 is a flowchart illustrating one example of a flow of processing of the inspection system according to the present example embodiment.

Another example of a flow of processing of the inspection system 10 is described using FIG. 15. FIG. 15 illustrates one example of a flow of processing for tracking a tracking target person. The processing is processing in a case where a mobile terminal carried by a worker is an apparatus other than smart glasses, for example, a smartphone, a tablet terminal, a smartwatch, a mobile phone, or the like. Processing illustrated in FIG. 15 is achieved by the storage unit 14, the worker peripheral image acquisition unit 15, the tracking target person detection unit 16, and the notification unit 17.

Processing illustrated in FIG. 15 is different from processing illustrated in FIG. 10 in a point that processing of S55 is included. In S55, the inspection system 10 registers, in tracking target person information (see FIG. 12), position information indicating a position of a worker at a time when a worker peripheral image in which a tracking target person is detected is generated, as position information indicating a position of a tracking target person. Further, the inspection system 10 notifies another worker of the position information indicating the position of the tracking target person.

Note that, processing of S55 may be performed before processing of S53 and S54, or may be performed with processing of S53 and S54 in parallel.

Other configuration of the inspection system 10 according to the present example embodiment is similar to that of the first and second example embodiments. In the inspection system 10 according to the present example embodiment, an advantageous effect similar to that of the first and second example embodiments is achieved. Further, in the inspection system 10 according to the present example embodiment, position information of a tracking target person acquired via a mobile terminal carried by a certain worker is notified to another worker. By the notification, not only a worker who photographs a tracking target person but also another worker can recognize a position of the tracking target person. Further, the another worker can rush to the spot as necessary, and support work such as a secondary inspection.

Fourth Example Embodiment

Figure 16:
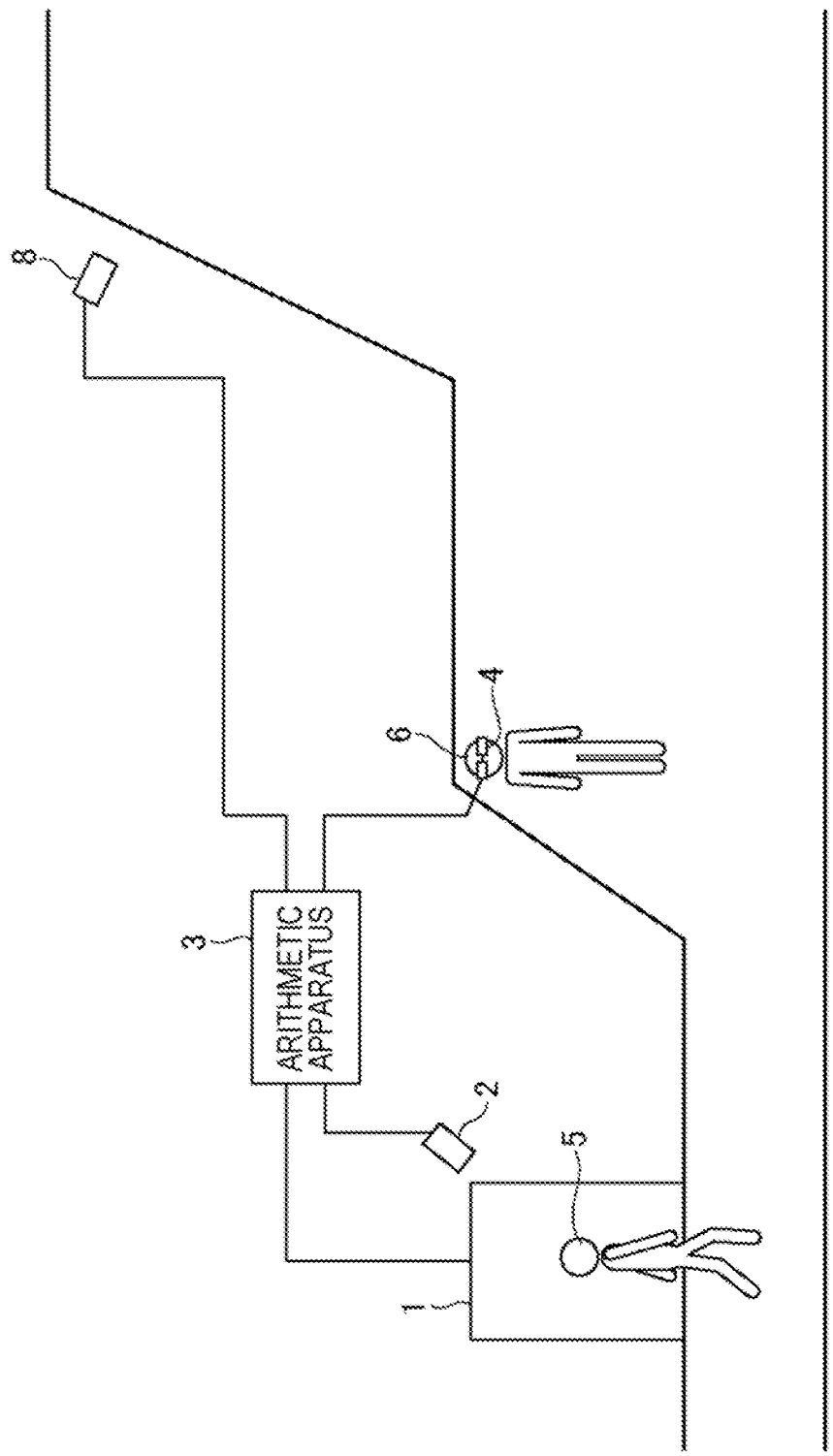
FIG. 16 is a diagram illustrating an overview of the inspection system according to the present example embodiment.

An inspection system 10 according to the present example embodiment further includes one or more surveillance cameras. As illustrated in FIG. 16, one or more surveillance cameras 8 photograph inside a facility after passing through an inspection point. The surveillance camera 8 may be a fixed point camera fixed at a predetermined position. In addition to the above, the surveillance camera 8 may be installed in a moving body, and photograph inside a facility, while moving. The moving body may be a moving body moving on the ground, may be a moving body moving in the air, may be a moving body moving on a rail, or may be a moving body moving underwater or on a water surface. Note that, in FIG. 16, a worker 6 wears smart glasses 4, but the worker 6 may carry another apparatus such as a smartphone, a tablet terminal, a smartwatch, and a mobile phone.

Figure 17:
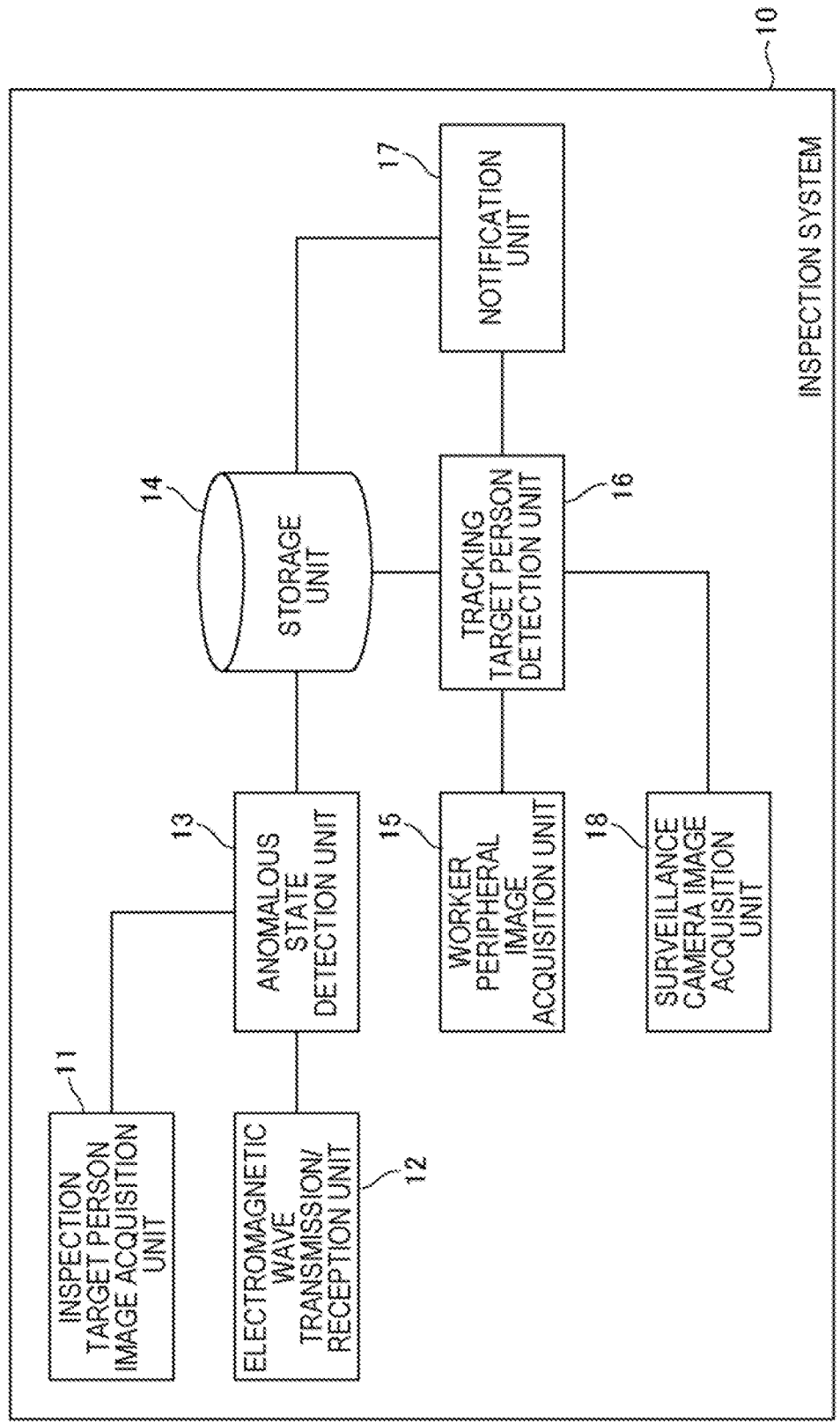
FIG. 17 is a diagram illustrating one example of a functional block diagram of the inspection system according to the present example embodiment.

As illustrated in a functional block diagram in FIG. 17, the inspection system 10 further includes a surveillance camera image acquisition unit 18. The surveillance camera image acquisition unit 18 is configured to include the above-described surveillance camera 8. The surveillance camera image acquisition unit 18 acquires a surveillance camera image by photographing a moving image or a still image by the surveillance camera 8.

A tracking target person detection unit 16 detects a tracking target person from a surveillance camera image, based on tracking target person information (see FIG. 5 or 12). The detection processing may be performed by setting tracking target person information in which a confirmation flag is "undone", specifically, only tracking target person information of a tracking target person for whom contact by a worker has not been performed, as a processing target (reference target). Tracking target person information in which a confirmation flag is "done", specifically, tracking target person information of a tracking target person for whom contact by a worker is completed may be eliminated from a processing target (reference target).

When detecting a tracking target person from a surveillance camera image, the tracking target person detection unit 16 registers, in tracking target person information, position information indicating a position of a surveillance camera at a time when the surveillance camera image is generated, as position information indicating a position of a tracking target person. For example, a column of position information in tracking target person information in FIG. 12 is updated each time each tracking target person is detected from a surveillance camera image. Note that, in a case where a function of the third example embodiment and a function of the fourth example embodiment are used in combination, a column of position information in tracking target person information in FIG. 12 is updated each time each tracking target person is detected from a worker peripheral image, and each time each tracking target person is detected from a surveillance camera image.

A notification unit 17 notifies a worker of position information of each tracking target person registered in tracking target person information, specifically, position information of a surveillance camera or a worker at a time when a latest surveillance camera image or a latest worker peripheral image in which each tracking target person is detected is generated. The notification is achieved via a mobile terminal carried by each worker.

By the notification, a worker can recognize a position of a tracking target person. Further, a worker can rush to the spot, and contact a tracking target person.

Note that, as illustrated in FIG. 13, the inspection system 10 may manage a position of each of a plurality of workers on a real-time basis. Management of a position of a worker may be achieved by using a position information acquisition function included in a mobile terminal carried by a worker, or may be achieved by using another well-known technique such as a beacon and an RF tag.

Further, the notification unit 17 may notify only a worker who satisfies a predetermined condition regarding a positional relation with respect to a tracking target person, of information indicating a position of the tracking target person. Examples of the predetermined condition are "being present on a same floor", "a distance to a tracking target person is equal to or less than a threshold value", "in a case where a plurality of workers are ranked in an order of increasing a distance to a tracking target person, being present in a predetermined ranking from a highest rank", and the like, but the predetermined condition is not limited thereto. This enables to notify only an appropriate worker.

Figure 18:
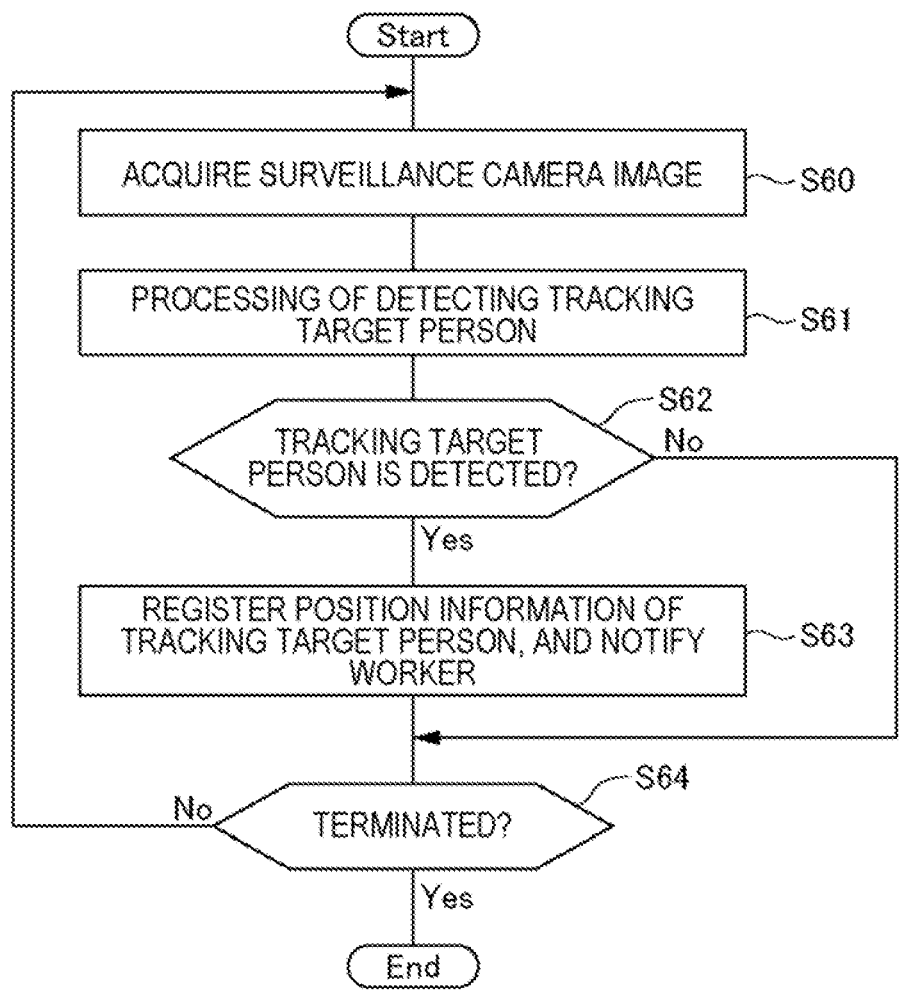
FIG. 18 is a flowchart illustrating one example of a flow of processing of the inspection system according to the present example embodiment.

Next, one example of a flow of processing of the inspection system 10 is described using FIGS. 12, 16, and 18. FIG. 18 illustrates one example of a flow of processing for tracking a tracking target person. Processing illustrated in FIG. 18 is achieved by a storage unit 14, the tracking target person detection unit 16, the notification unit 17, and the surveillance camera image acquisition unit 18.

First, the inspection system 10 acquires a surveillance camera image generated by a surveillance camera (S60). For example, the surveillance camera 8 illustrated in FIG. 16 generates a surveillance camera image.

Next, the inspection system 10 performs processing of detecting a tracking target person from the surveillance camera image, based on tracking target person information (see FIG. 12) stored in the storage unit 14 (S61).

In a case where a tracking target person is detected from a surveillance camera image (Yes in S62), the inspection system 10 registers, in the tracking target person information (see FIG. 12), position information indicating a position of the surveillance camera at a time when the surveillance camera image in which the tracking target person is detected is generated, as position information indicating a position of a tracking target person (S63). Then, the inspection system 10 notifies a worker of the position information indicating the position of the tracking target person (S63). A worker can approach the tracking target person, based on the information. Consequently, a possibility with which a tracking target person is included in a worker peripheral image to be photographed by a worker increases.

In a case where a tracking target person is not detected from a surveillance camera image (No in S62), processing of S63 is not performed.

The above-described processing from S61 to S63 is performed speedily by real-time processing in response to acquisition of a surveillance camera image in S60.

Note that, processing of S61 may be performed by setting tracking target person information in which a confirmation flag is "undone", specifically, only tracking target person information of a tracking target person for whom contact by a worker has not been performed, as a processing target (reference target). Tracking target person information in which a confirmation flag is "done", specifically, tracking target person information of a tracking target person for whom contact by a worker is completed may be eliminated from a processing target (reference target).

Other configuration of the inspection system 10 according to the present example embodiment is similar to that of the first to third example embodiments. In the inspection system 10 according to the present example embodiment, an advantageous effect similar to that of the first to third example embodiments is achieved. Further, in the inspection system 10 according to the present example embodiment, it is possible to track a tracking target person by further using a surveillance camera image generated with use of a surveillance camera, in addition to a worker peripheral image generated with use of a mobile terminal carried by a worker. Therefore, it becomes possible to find a tracking target person speedily.

Fifth Example Embodiment

Figure 19:
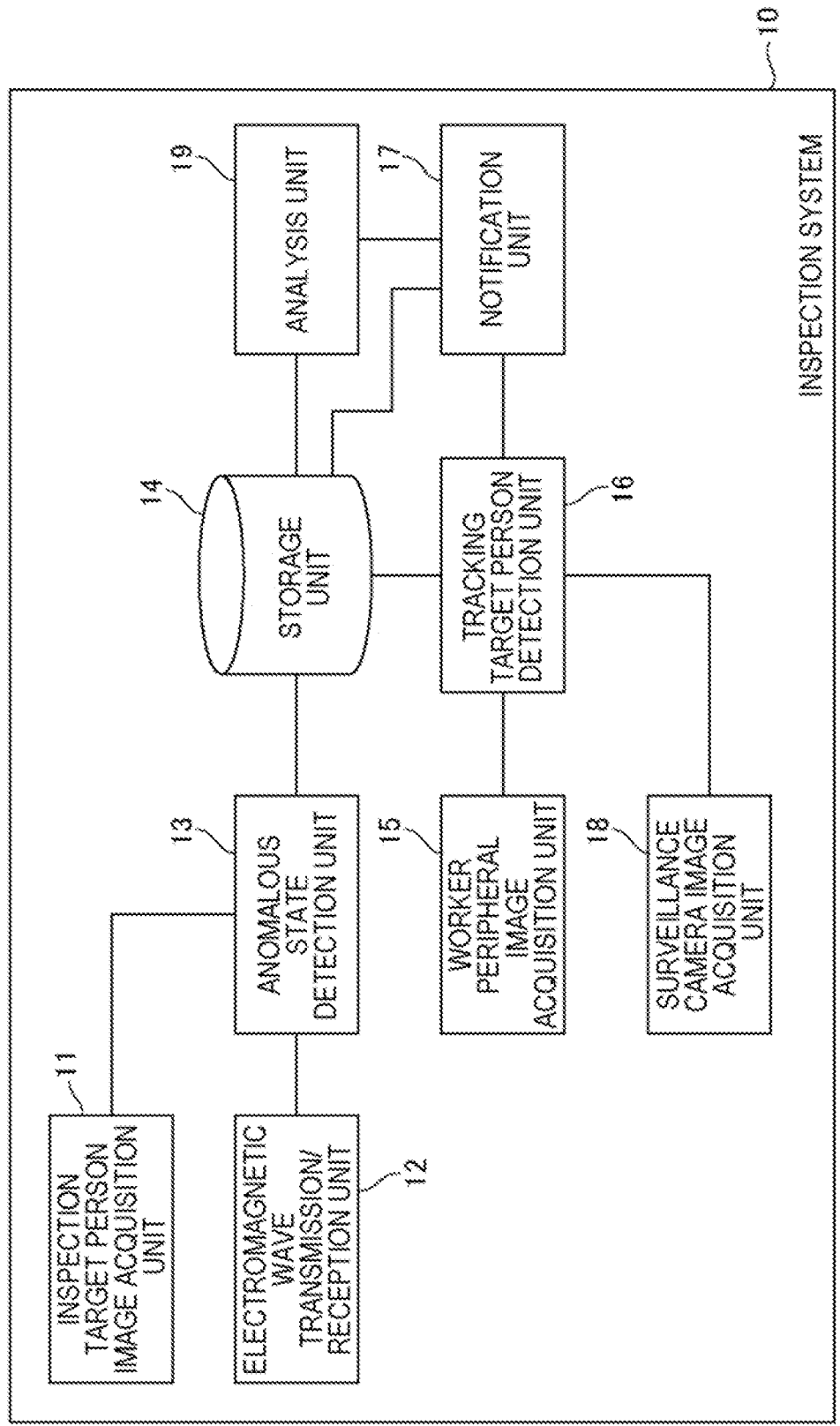
FIG. 19 is a diagram illustrating one example of a functional block diagram of the inspection system according to the present example embodiment.

As illustrated in a functional block diagram in FIG. 19, an inspection system 10 according to the present example embodiment is different from that of the first to fourth example embodiments in a point that an analysis unit 19 is further included. Note that, the inspection system 10 may or may not include a surveillance camera image acquisition unit 18.

The analysis unit 19 generates information to be provided to a worker, based on a position of a tracking target person. Further, a notification unit 17 notifies a worker of the information generated by the analysis unit 19. Notification to a worker is achieved via a mobile terminal carried by the worker.

The analysis unit 19 performs at least either one of the following first and second analysis examples.

First Analysis Example

The analysis unit 19 predicts a travel route of a tracking target person from now on, based on a position of the detected tracking target person. Further, the notification unit 17 notifies a worker of a prediction result on the travel route of the tracking target person from now on being computed by the analysis unit 19.

For example, the analysis unit 19 determines a travel route of a tracking target person so far, based on a position history of the tracking target person. Further, the analysis unit 19 estimates a travel route of the tracking target person from now on, based on the travel route so far. The number of travel routes from now on to be output as an estimation result may be one or plural. Estimation of a travel route may be achieved, for example, by using an estimation model generated by machine learning based on training data in which a route so far and a route from now on are associated with each other, or may be achieved by another means.

Note that, as illustrated in FIG. 13, the inspection system 10 may manage a position of each of a plurality of workers on a real-time basis. Management of a position of a worker may be achieved by using a position information acquisition function included in a mobile terminal carried by the worker, or may be achieved by using another well-known technique such as a beacon and an RF tag.

Further, the notification unit 17 may notify only a worker who satisfies a predetermined condition regarding a positional relation with respect to a tracking target person, or a positional relation with respect to a travel route of a tracking target person from now on, of information indicating the travel route of the tracking target person from now on. Examples of the predetermined condition are "being present on a same floor as a tracking target person", "a distance to a tracking target person is equal to or less than a threshold value", "in a case where a plurality of workers are ranked in an order of increasing a distance to a tracking target person, being present in a predetermined ranking from a highest rank", "being on a same floor as a predetermined position of a tracking target person on a travel route from now on", "a distance to a predetermined position of a tracking target person on a travel route from now on is equal to or less than a threshold value", and "in a case where a plurality of workers are ranked in an order of increasing a distance to a predetermined position of a tracking target person on a travel route from now on, being present in a predetermined ranking from a highest rank", and the like, but the predetermined condition is not limited thereto. A predetermined position of a tracking target person on a travel route from now on is, for example, "a position where a tracking target person is predicted to be present at a predetermined time later", and the like, but is not limited thereto. A moving velocity of a tracking target person is necessary for prediction of the position. A moving velocity of a tracking target person may be computed based on a position history of the tracking target person, or a general moving velocity of a user in an associated facility being registered in the inspection system 10 in advance may be used. This enables to notify only an appropriate worker.

Second Analysis Example

The analysis unit 19 determines an instruction content to be provided to each of a plurality of workers, based on a travel route of a tracking target person from now on being computed in the first analysis example, and a position of each of the plurality of workers. Further, the notification unit 17 notifies each worker of an instruction content of each worker determined by the analysis unit 19.

As one example of an instruction content, a move and an ambush are exemplified. For example, the analysis unit 19 determines, as an ambush position, a predetermined position of a tracking target person on a travel route from now on. For example, a position where a tracking target person is predicted to be present at a predetermined time later (example: five minutes later) is determined as an ambush position. Further, the analysis unit 19 determines, based on a position of each of a plurality of workers and a moving velocity of a worker registered in advance in the inspection system 10, a worker who can reach the ambush position before the predetermined time elapses. Further, the analysis unit 19 determines, as an instruction to be provided to a specific worker, "moving to the ambush position, and ambushing the tracking target person at the ambush position".

Further, the analysis unit 19 may determine, as a preliminary ambush position, one or more positions determined by using the above-described ambush position as a reference. Further, the analysis unit 19 can determine a worker who moves to the preliminary ambush position, and ambushes, by a method similar to the above-described method. Further, the analysis unit 19 can determine, as an instruction to be provided to the determined worker, "moving to the preliminary ambush position, and ambushing the tracking target person at the preliminary ambush position". This allows a worker who ambushes at a preliminary ambush position to contact a tracking target person, even when contact to the tracking target person at an ambush position has failed.

Note that, in the tracking target person information in FIG. 12, the analysis unit 19 may set, as an analysis target, only a tracking target person in which a confirmation flag is "undone". Further, in the tracking target person information in FIG. 12, the analysis unit 19 may eliminate, from the analysis target, a tracking target person in which a confirmation flag is "done".

Figure 20:
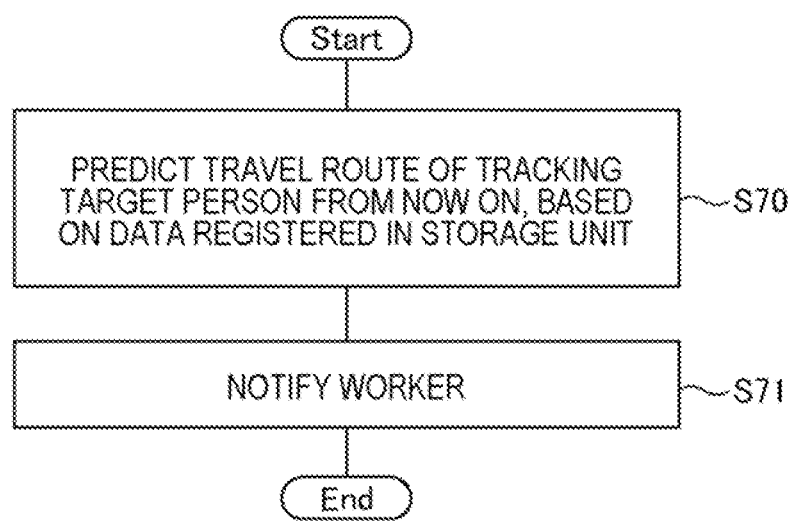
FIG. 20 is a flowchart illustrating one example of a flow of processing of the inspection system according to the present example embodiment.

Next, one example of a flow of processing of the inspection system 10 is described using a flowchart in FIG. 20. The processing is based on a premise that the analysis unit 19 performs the above-described first analysis example.

The inspection system 10 predicts a travel route of a tracking target person from now on, based on a position information history of the tracking target person stored in the storage unit 14 (S70). Then, the inspection unit 10 notifies a worker of the predicted travel route of the tracking target person from now on (S71).

Other configuration of the inspection system 10 according to the present example embodiment is similar to that of the first to fourth example embodiments. In the inspection system 10 according to the present example embodiment, an advantageous effect similar to that of the first to fourth example embodiments is achieved. Further, in the inspection system 10 according to the present example embodiment, it is possible to predict a travel route of a tracking target person from now on, and notify a worker. A worker can go ahead of a tracking target person, based on the notification, and ambushes the tracking target person. Consequently, a possibility with which a tracking target person is included in a worker peripheral image to be photographed by a worker increases.

Further, in the inspection system 10 according to the present example embodiment, an instruction content to be provided to each of a plurality of workers can be determined, and notified to each worker. According to the inspection system 10 as described above, it is possible to suppress an inconvenience that a plurality of workers concurrently track a same tracking target person, or an inconvenience that none of the workers tracks a certain tracking target person. Further, since a plurality of workers can track a tracking target person in cooperation, it is possible to efficiently and accurately track the tracking target person.

Modification Examples

Hereinafter, modification examples applicable to all the example embodiments are described.

First Modification Example

An anomalous state in the above-described example embodiments is a state in which a person present in a predetermined area carries a detection target object being set in advance. Further, an anomalous state detection unit 13 detects, from a signal of a reflection wave, anomalous data (feature value of a detection target object) that are not preferable to be included in a signal of a reflection wave.

In the modification example, the anomalous state detection unit 13 performs detection processing of referring to normal data that are preferable to be included, and detecting an anomalous state (state different from a state indicated by normal data) from a signal of a reflection wave.

Second Modification Example

In the above-described example embodiments, a target object being prohibited to be carried in is set as a detection target object. Further, a state in which a person present in a predetermined area carries a detection target object being set in advance is detected as an anomalous state. In the modification example, a target object being needed to be carried by a user is set as a detection target object. For example, a badge of a police officer, an article that is obliged to be carried by a person participating in an event, and the like are a detection target object in the modification example. Further, in the modification example, a state in which a person present in a predetermined area does not carry a detection target object being set in advance is detected as an anomalous state.

Note that, a target object being prohibited to be carried in may be set as a first detection target object, and a target object being needed to be carried by a user may be set as a second detection target object. In this case, a detection result is classified into a plurality of cases "a case where a first detection target object is detected, but a second detection target object is not detected", "a case where a second detection target object is detected, but a first detection target object is not detected", "a case where both of a first detection target object and a second detection target object are detected", "a case where neither a first detection target object nor a second detection target object is detected", and the like. It is a design matter to determine which case is detected as an anomalous state.

Third Modification Example

An inspection system 10 may include a means for performing predetermined marking processing with respect to an inspection target person in which an anomalous state is detected. The means is installed, for example, at an inspection point. The means throws a color ball, applies a paint shining with black light, or mounts a small transmitter with respect to an inspection target person in which an anomalous state is detected. A worker tracks a tracking target person, based on a color applied from the color ball, the paint, the small transmitter, or the like.

Fourth Modification Example

The inspection system 10 manages a position of each of a plurality of tracking target persons, and a position of each of a plurality of workers on a real-time basis. One example of processing that achieves the above is as described above. Further, when a distance between a tracking target person and a worker becomes equal to or less than a threshold value, the inspection system 10 notifies the worker accordingly. The notification is achieved via a mobile terminal carried by a worker. For example, when a distance between a tracking target person and a worker becomes equal to or less than a threshold value, the inspection system 10 may output a predetermined sound (example: a buzzer sound, an alarm sound, or the like) to a mobile terminal, may notify the above by vibration, may notify the above by turning on a warning lamp, or may notify the above by displaying predetermined information. Further, by differentiating an output content depending on a size of the above-described distance, a worker may be notified that the above-described distance is decreasing. For example, as the above-described distance decreases, a sound tempo, a tempo at which a lamp blinks, or the like may be increased.

Fifth Modification Example

The inspection system 10 manages a position of each of a plurality of tracking target persons, and a position of each of a plurality of workers on a real-time basis. Further, the inspection system 10 generates a map in which the position of each of the plurality of tracking target persons, and the position of each of the plurality of workers are mapped, and notifies a worker.

Further, the inspection system 10 may further perform mapping, on the above-described map, at least either one of a travel route of a tracking target person so far, and a prediction result on a travel route of the tracking target person from now on. A means for acquiring a travel route of a tracking target person so far, and a travel route of a tracking target person from now on is as described in the above-described example embodiments.

Further, the inspection system 10 may further compute a travel route, in a case of generating an instruction to cause a worker to move as described in the fifth example embodiment, and notifying to each worker. Further, the inspection system 10 may display, on the above-described map, a computed travel route. A travel route is computed based on a current position of a worker, and a destination to which the worker is moved. A means for computing a travel route is not specifically limited, and any technique can be adopted.

Sixth Modification Example

A mobile terminal carried by a worker may include a call function for making a call between workers.

Also in these modification examples, an advantageous effect similar to that of the above-described example embodiments is achieved.

Note that, in the present specification, "acquisition" includes at least one of "acquisition of data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "input of data to be output from another apparatus to an own apparatus (passive acquisition)", based on a user input, or based on a command of a program, for example, receiving data to be distributed (or transmitted, push-notified, or the like), and acquiring by selecting from received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. An inspection system including:
    an inspection target person image acquisition means for acquiring an inspection target person image including an inspection target person;
    an electromagnetic wave transmission/reception means for irradiating an electromagnetic wave having a wavelength of equal to or more than 30 micrometers and equal to or less than one meter toward the inspection target person, and receiving a reflection wave;
    an anomalous state detection means for performing detection processing of detecting an anomalous state, based on a signal of the reflection wave, and causing a storage means to store tracking target person information indicating an external appearance of a tracking target person being the inspection target person in which the anomalous state is detected;
    a worker peripheral image acquisition means for acquiring a worker peripheral image including scenery in a periphery of a worker;
    a tracking target person detection means for detecting the tracking target person from the worker peripheral image, based on the tracking target person information; and
    a notification means for notifying the worker of a position of the tracking target person detected from the worker peripheral image.
2. The inspection system according to supplementary note 1, wherein
    the worker wears smart glasses,
    the smart glasses generate the worker peripheral image including a field of view of the worker, and
    the notification means causes the smart glasses to display an image for identifying the detected tracking target person over a field of view of the worker.
3. The inspection system according to supplementary note 1, wherein
    the notification means causes a mobile terminal carried by the worker to display an image in which information for identifying the detected tracking target person is displayed over the worker peripheral image.

4. The inspection system according to any one of supplementary notes 1 to 3, wherein
the worker peripheral image acquisition means acquires position information of the worker at a time when the worker peripheral image is generated, and
the notification means notifies another worker of position information of the worker at a time when the worker peripheral image in which the tracking target person is detected is generated.

5. The inspection system according to any one of supplementary notes 1 to 4, further including
a surveillance camera image acquisition means for acquiring a surveillance camera image generated by a surveillance camera, wherein
the tracking target person detection means detects the tracking target person from the surveillance camera image, based on the tracking target person information, and
the notification means notifies the worker of information indicating a position of the tracking target person detected from the surveillance camera image.

6. The inspection system according to supplementary note 4 or 5, wherein
the notification means notifies the worker who satisfies a predetermined condition regarding a positional relation with respect to the tracking target person, of information indicating a position of the tracking target person.

7. The inspection system according to any one of supplementary notes 1 to 6, wherein
the notification means further notifies the worker of a content of the detected anomalous state.

8. The inspection system according to any one of supplementary notes 1 to 7, further including
an analysis means for predicting a travel route of the tracking target person from now on, based on a position of the detected tracking target person, wherein
the notification means notifies the worker of a prediction result on a travel route of the tracking target person from now on.

9. The inspection system according to supplementary note 8, wherein
the analysis means determines an instruction content to be provided to the worker, based on a prediction result on a travel route of the tracking target person from now on, and a current position of the worker, and
the notification means notifies the worker of the instruction content.

10. An inspection method including:
by a computer,
acquiring an inspection target person image including an inspection target person;
irradiating an electromagnetic wave having a wavelength of equal to or more than 30 micrometers and equal to or less than one meter toward the inspection target person, and receiving a reflection wave;
performing detection processing of detecting an anomalous state, based on a signal of the reflection wave, and causing a storage means to store tracking target person information indicating an external appearance of a tracking target person being the inspection target person in which the anomalous state is detected;
acquiring a worker peripheral image including scenery in a periphery of a worker;
detecting the tracking target person from the worker peripheral image, based on the tracking target person information; and
notifying the worker of a position of the tracking target person detected from the worker peripheral image.

1 Sensor panel
2 Camera
3 Arithmetic apparatus
4 Smart glasses
5 Inspection target person
6 Worker
7 Mobile terminal
10 Inspection system
12 Electromagnetic wave transmission/reception unit
13 Anomalous state detection unit
14 Storage unit
15 Worker peripheral image acquisition unit
16 Tracking target person detection unit
17 Notification unit
18 Surveillance camera image acquisition unit
19 Analysis unit
1A Processor
2A Memory
3A Input/output interface (I/F)
4A Peripheral circuit
5A Bus

The invention claimed is:

1. An inspection system comprising:
at least one memory configured to store one or more instructions; and
at least one processor configured to execute the one or more instructions to:
acquire an inspection target person image including an inspection target person at an inspection point where a device, which irradiates an electromagnetic wave and receives a reflection wave, is installed;
irradiate an electromagnetic wave having a wavelength of equal to or more than 30 micrometers and equal to or less than one meter toward the inspection target person at the inspection point, and receive a reflection wave;
perform detection processing of detecting an anomalous state, based on a signal of the reflection wave, and cause storage means to store tracking target person information, which is created based on the inspection target person image captured at the inspection point, indicating an external appearance of a tracking target person being the inspection target person in which the anomalous state is detected;
acquire a worker peripheral image including scenery in a periphery of a worker at an area after passing through the inspection point;
detect the tracking target person from the worker peripheral image, captured at the area after passing through the inspection point based on the tracking target person information; and
notify the worker of a position of the tracking target person detected from the worker peripheral image captured at the area after passing through the inspection point.

2. The inspection system according to claim 1, wherein the worker wears smart glasses, the smart glasses generate the worker peripheral image including a field of view of the worker, and the processor is further configured to execute the one or more instructions to cause the smart glasses to display an image for identifying the detected tracking target person over the field of view of the worker.

3. The inspection system according to claim 1, wherein the processor is further configured to execute the one or more instructions to cause a mobile terminal carried by the worker to display an image in which information for identifying the detected tracking target person is displayed over the worker peripheral image.

4. The inspection system according to claim 1, wherein the processor is further configured to execute the one or more instructions to:

acquire position information of the worker at a time when the worker peripheral image is generated, and notify another worker of position information of the worker at a time when the worker peripheral image in which the tracking target person is detected is generated.

5. The inspection system according to claim 1, wherein the processor is further configured to execute the one or more instructions to:

acquire a surveillance camera image generated by a surveillance camera, detect the tracking target person from the surveillance camera image, based on the tracking target person information, and notify the worker of information indicating a position of the tracking target person detected from the surveillance camera image.

6. The inspection system according to claim 4, wherein the processor is further configured to execute the one or more instructions to notify the worker who satisfies a predetermined condition regarding a positional relation with respect to the tracking target person, of information indicating a position of the tracking target person.

7. The inspection system according to claim 1, wherein the processor is further configured to execute the one or more instructions to notify the worker of a content of the detected anomalous state.

8. The inspection system according to claim 1, wherein the processor is further configured to execute the one or more instructions to:

predict a travel route of the tracking target person from now on, based on a position of the detected tracking target person, and notify the worker of a prediction result on the travel route of the tracking target person from now on.

9. The inspection system according to claim 8, wherein the processor is further configured to execute the one or more instructions to:

determine an instruction content to be provided to the worker, based on a prediction result on the travel route of the tracking target person from now on, and a current position of the worker, and notify the worker of the instruction content.

10. An inspection method comprising:

by a computer, acquiring an inspection target person image including an inspection target person at an inspection point where a device, which irradiates an electromagnetic wave and receives a reflection wave, is installed;

irradiating an electromagnetic wave having a wavelength of equal to or more than 30 micrometers and equal to or less than one meter toward the inspection target person at the inspection point, and receiving a reflection wave;

performing detection processing of detecting an anomalous state, based on a signal of the reflection wave, and causing storage means to store tracking target person information, which is created based on the inspection target person image captured at the inspection point, indicating an external appearance of a tracking target person being the inspection target person in which the anomalous state is detected;

acquiring a worker peripheral image including scenery in a periphery of a worker at an area after passing through the inspection point;

detecting the tracking target person from the worker peripheral image, captured at the area after passing through the inspection point, based on the tracking target person information; and notifying the worker of a position of the tracking target person detected from the worker peripheral image captured at the area after passing through the inspection point.

* * * * *